US012585072B2

(12) United States Patent
Takano et al.

(10) Patent No.: US 12,585,072 B2
(45) Date of Patent: Mar. 24, 2026

(54) VSFF CONNECTOR AND ADAPTER

(71) Applicant: SENKO ADVANCED COMPONENTS, INC., Hudson, MA (US)

(72) Inventors: Kazuyoshi Takano, Tokyo (JP); Man Ming Ho, Kowloon (HK); Man Kit Wong, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 301 days.

(21) Appl. No.: 18/363,551

(22) Filed: Aug. 1, 2023

(65) Prior Publication Data

US 2024/0036266 A1 Feb. 1, 2024

Related U.S. Application Data

(60) Provisional application No. 63/370,060, filed on Aug. 1, 2022.

(51) Int. Cl.
*G02B 6/38* (2006.01)
*H01R 13/627* (2006.01)

(52) U.S. Cl.
CPC ......... *G02B 6/3825* (2013.01); *G02B 6/3831* (2013.01); *G02B 6/3893* (2013.01); *H01R 13/6273* (2013.01)

(58) Field of Classification Search
CPC .......................... G02B 6/3831; H01R 13/6273
See application file for complete search history.

(56) References Cited

U.S. PATENT DOCUMENTS

| | | | |
|---|---|---|---|
| 10,705,300 B2 | 7/2020 | Takano et al. | |
| 11,280,972 B2 | 3/2022 | Takano et al. | |
| 11,307,369 B2 | 4/2022 | Takano et al. | |
| 2016/0209604 A1* | 7/2016 | Scherer ................ | H01R 13/641 |
| 2016/0266326 A1 | 9/2016 | Gniadek | |
| 2016/0349458 A1* | 12/2016 | Murray .................. | G02B 6/387 |
| 2020/0333537 A1* | 10/2020 | Gniadek .............. | G02B 6/3893 |
| 2020/0408998 A1 | 12/2020 | Iizumi et al. | |
| 2021/0011235 A1 | 1/2021 | Wimmer | |

* cited by examiner

*Primary Examiner* — Sung H Pak

(57) ABSTRACT

Cross-compatible VSFF connection systems include optical connectors that are compatible with at least two types of adapters and adapters that are compatible with at least two types of optical connectors. Optical connectors have one or both of connector latch recesses and depressible latches, and likewise adapters have one or both of adapter latch arms and adapter latch recesses. Dual latch function connectors and adapters are capable of connection to a mating components that have only one type of latch structure, e.g., only recesses or only latches. Connection systems can be duplex or MT and may facilitate push-pull boot remote release and polarity change.

19 Claims, 40 Drawing Sheets

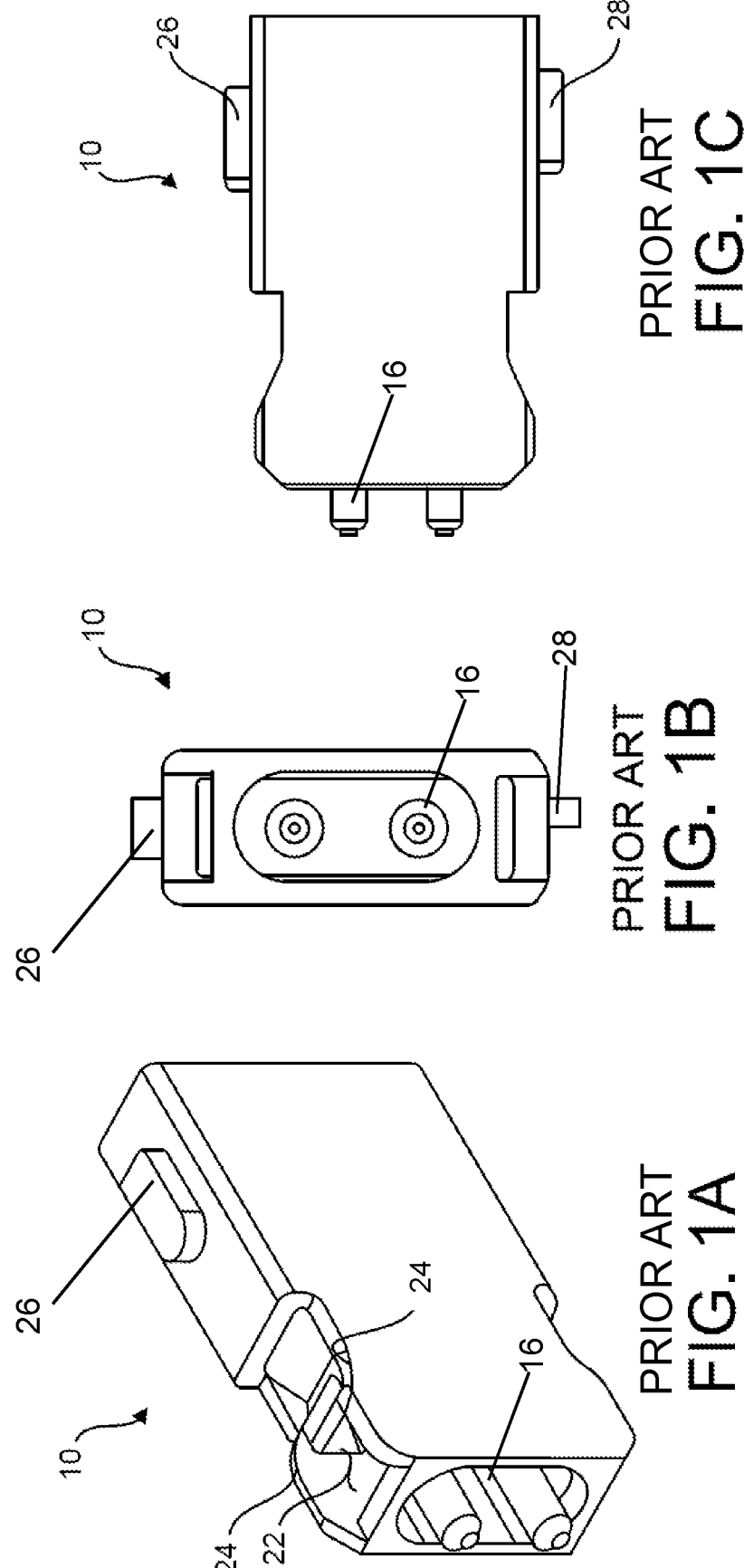
PRIOR ART
FIG. 1C
PRIOR ART
FIG. 1B
PRIOR ART
FIG. 1A

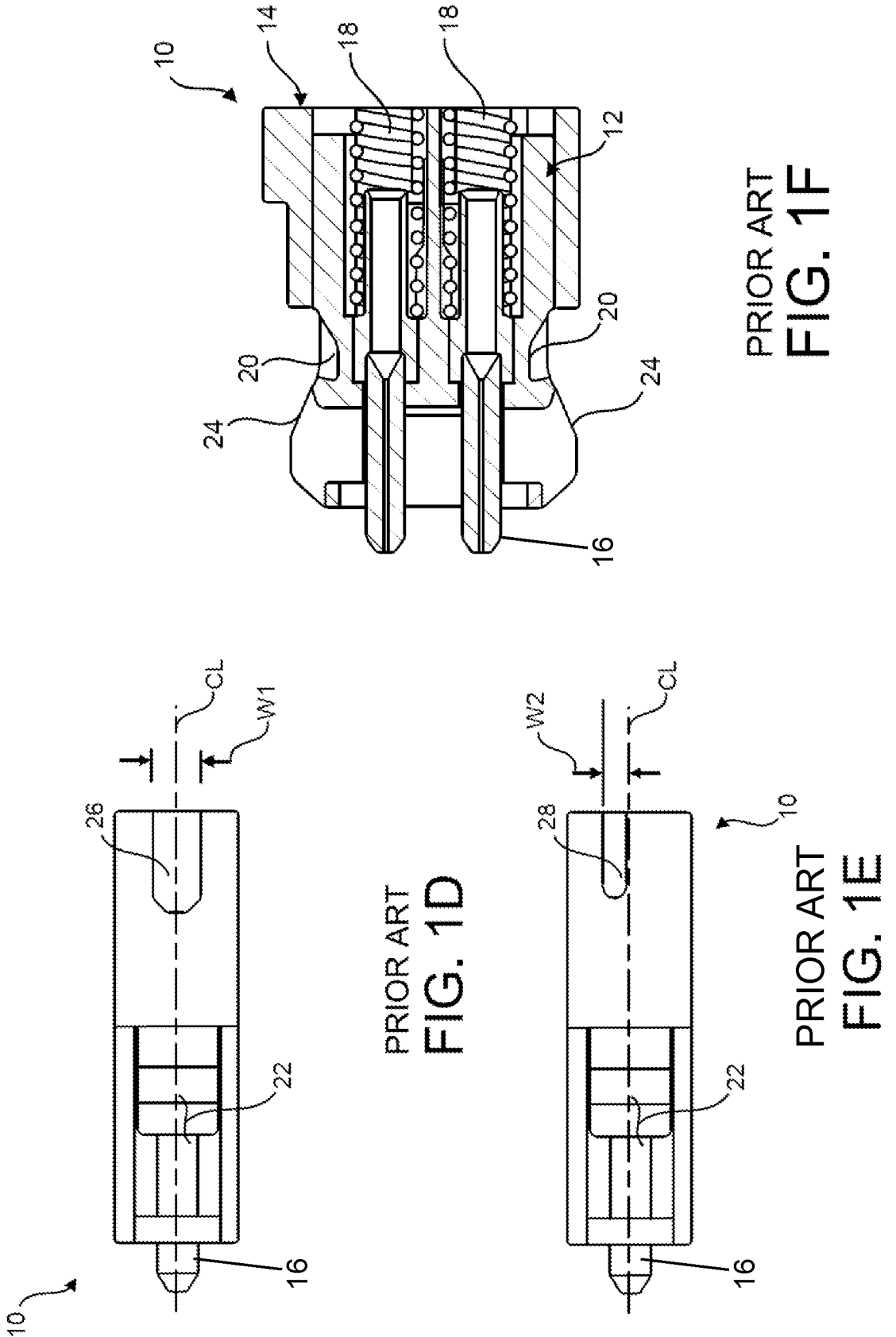
PRIOR ART
FIG. 1F
PRIOR ART
FIG. 1D
PRIOR ART
FIG. 1E

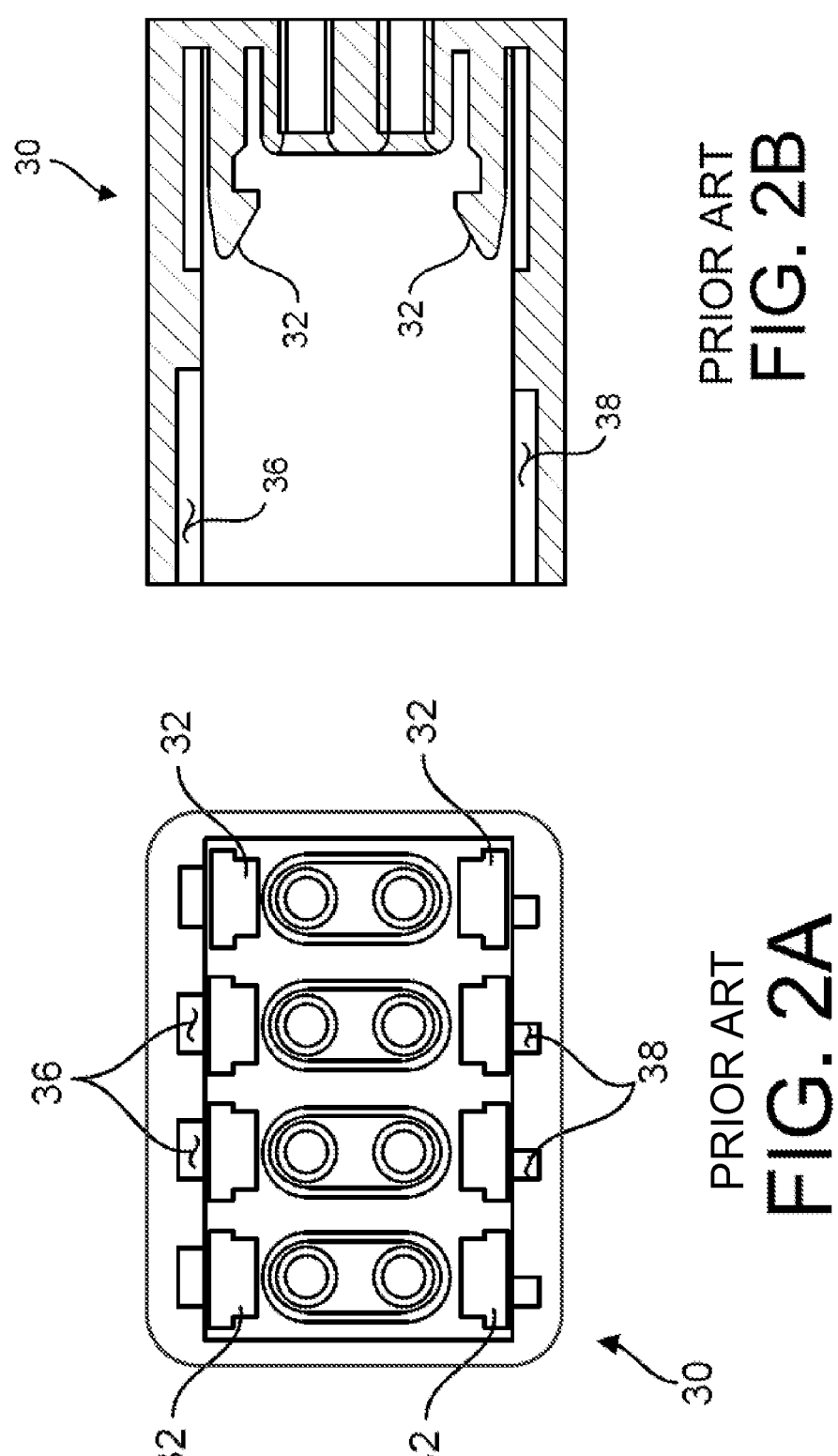
PRIOR ART
FIG. 2B
PRIOR ART
FIG. 2A

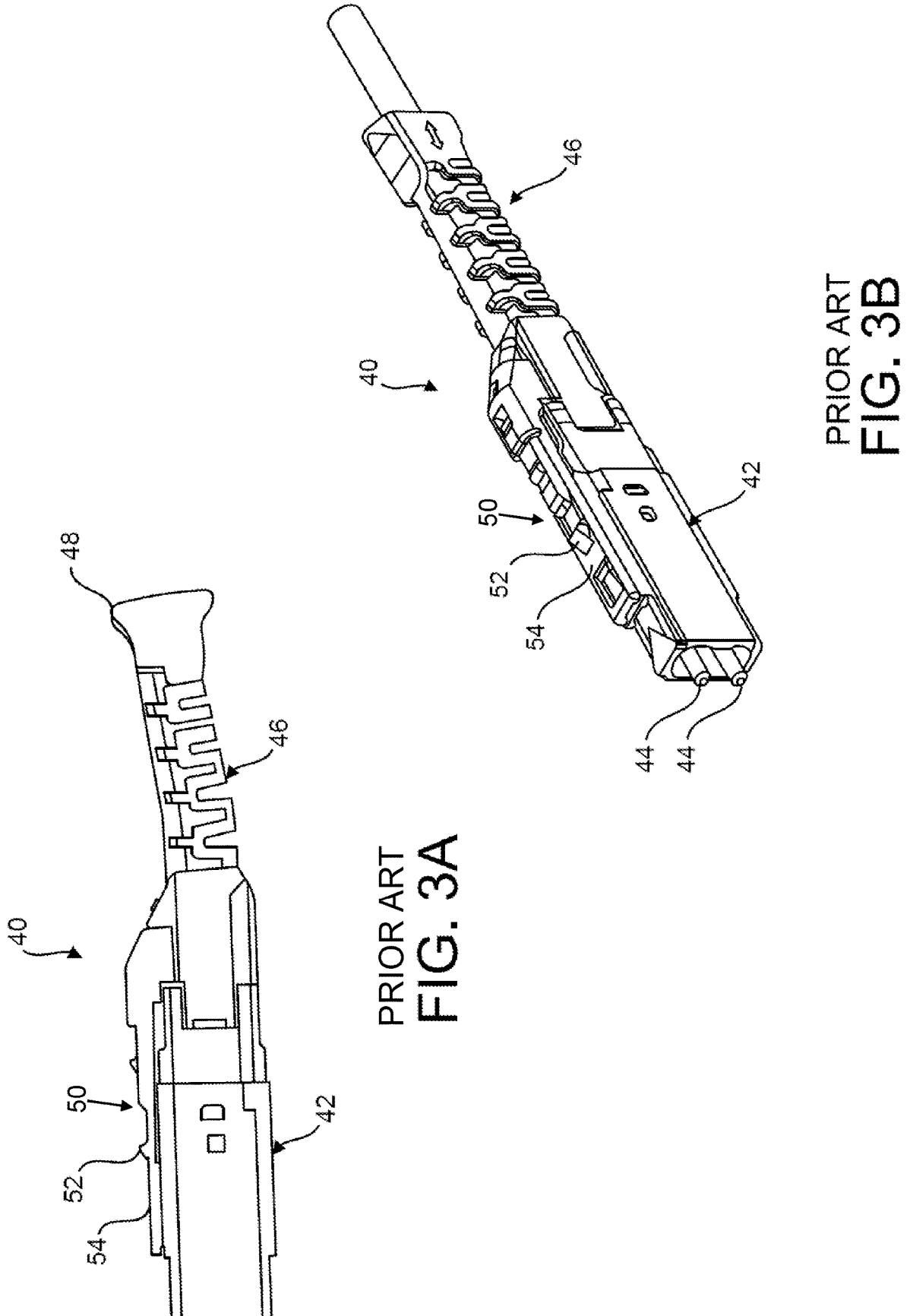
PRIOR ART
FIG. 3A
PRIOR ART
FIG. 3B

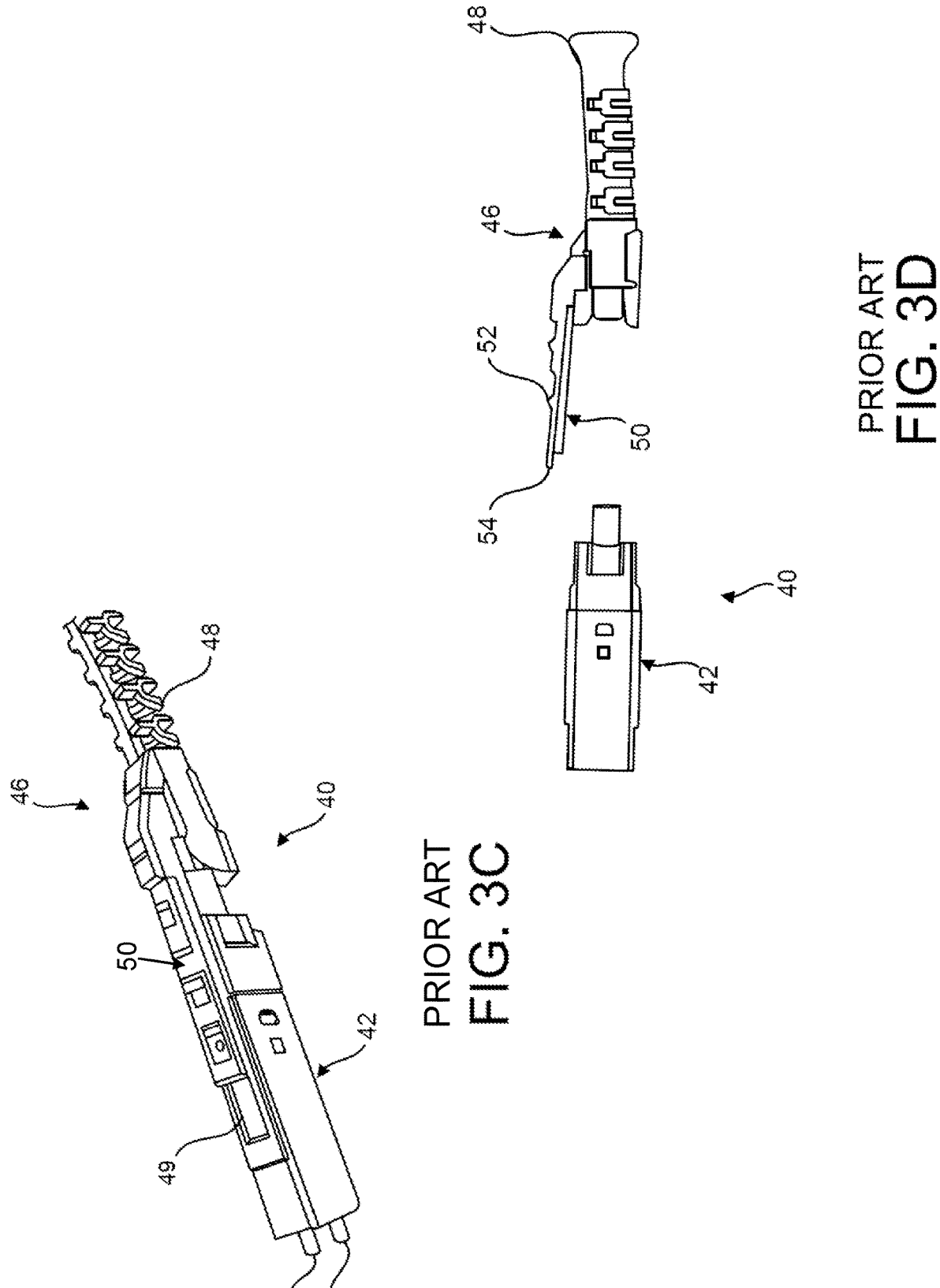
PRIOR ART
FIG. 3C
PRIOR ART
FIG. 3D

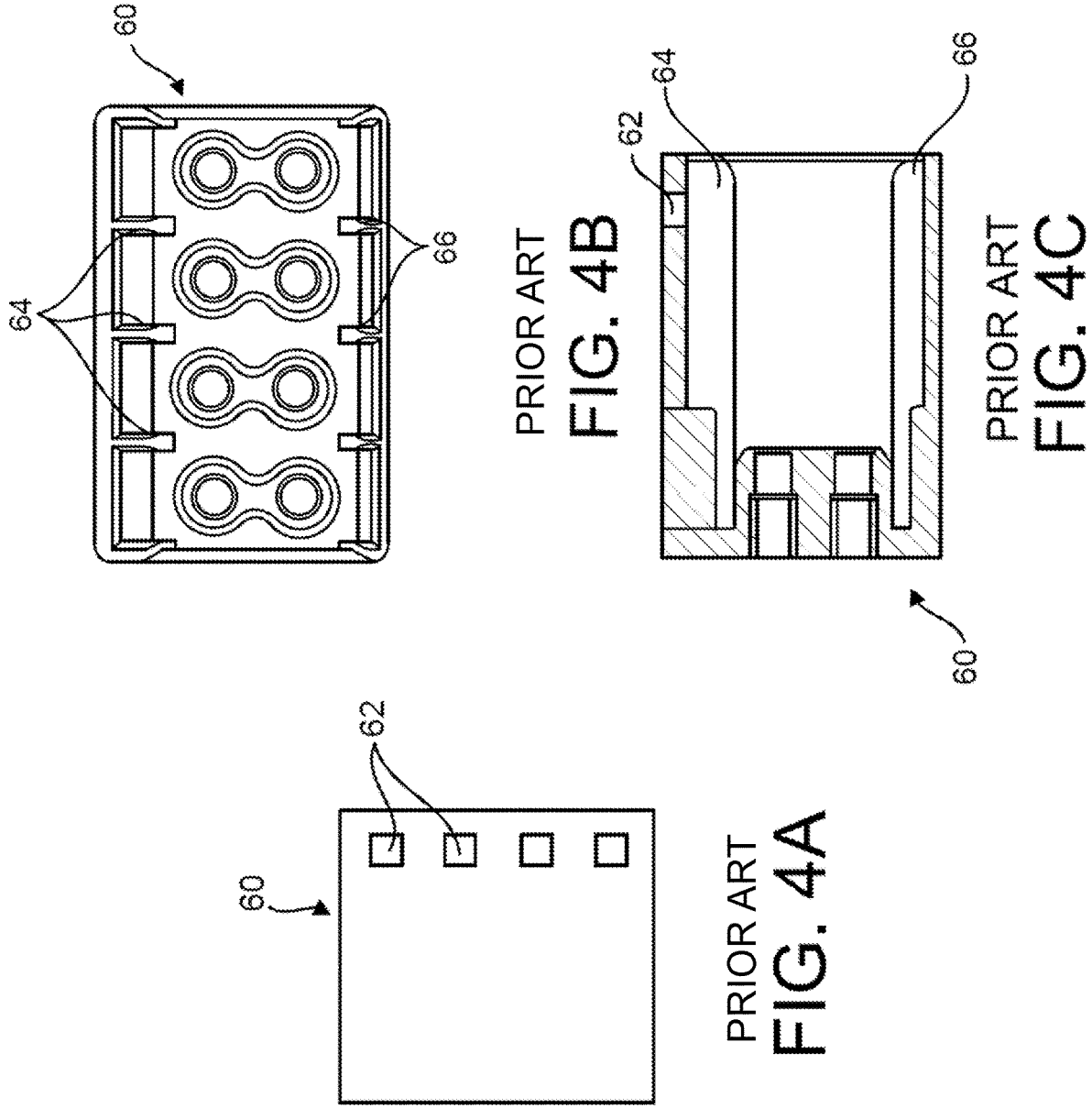
PRIOR ART
FIG. 4B
PRIOR ART
FIG. 4C
PRIOR ART
FIG. 4A

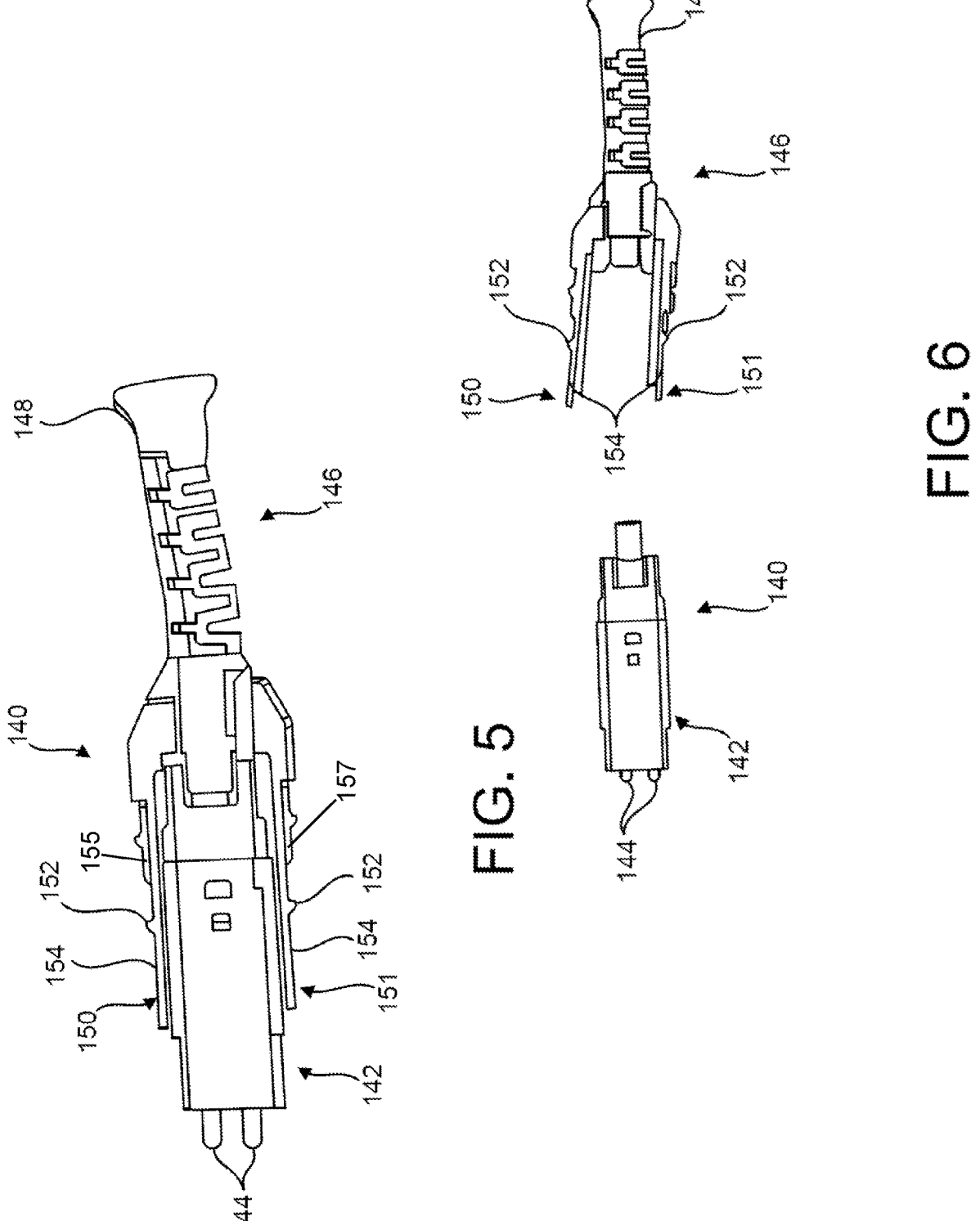
FIG. 5
FIG. 6

FIG. 7
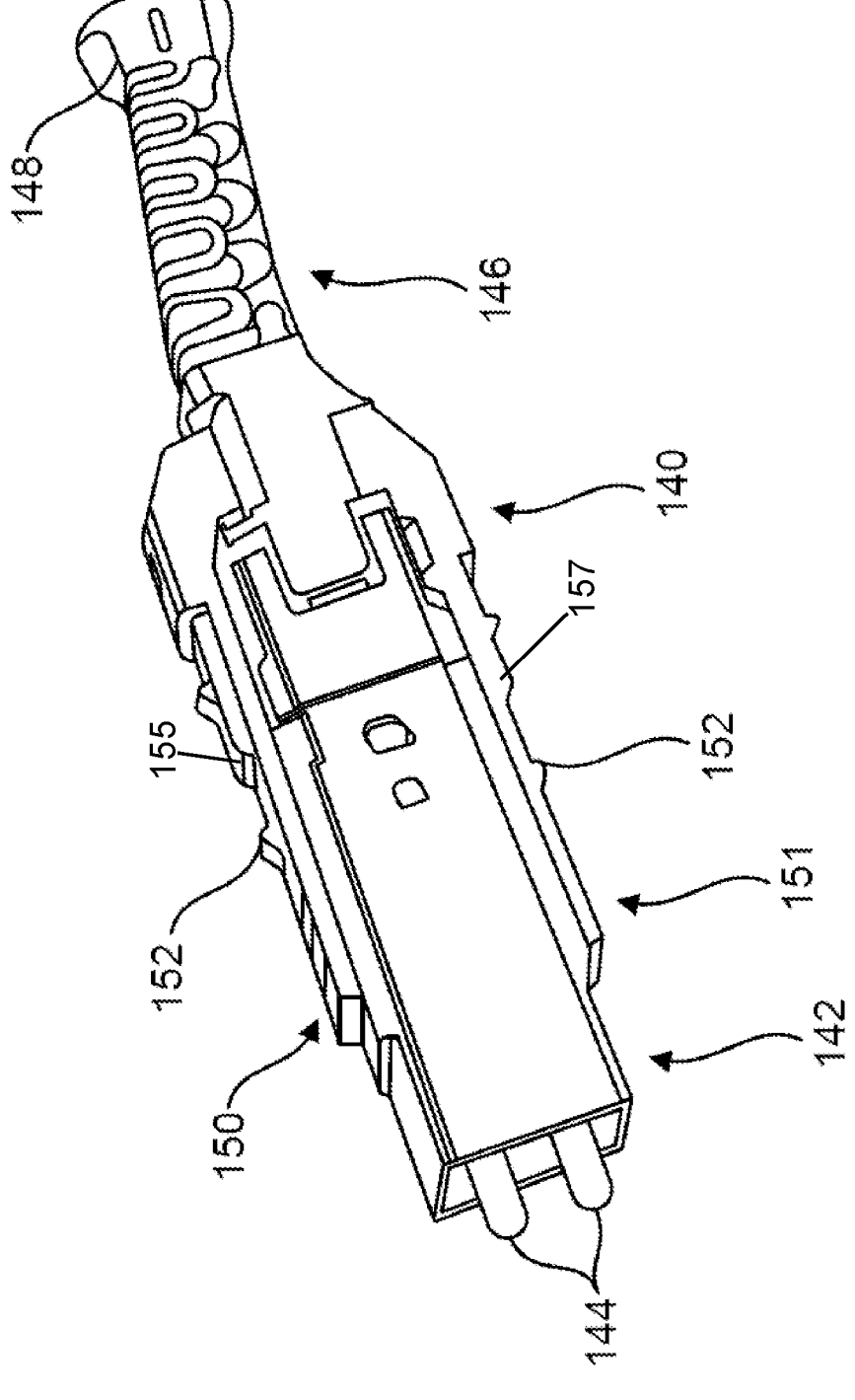

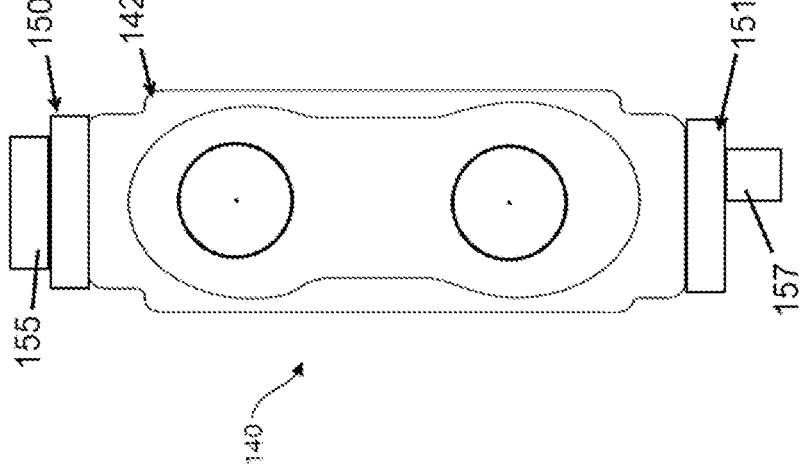
FIG. 8

FIG. 9
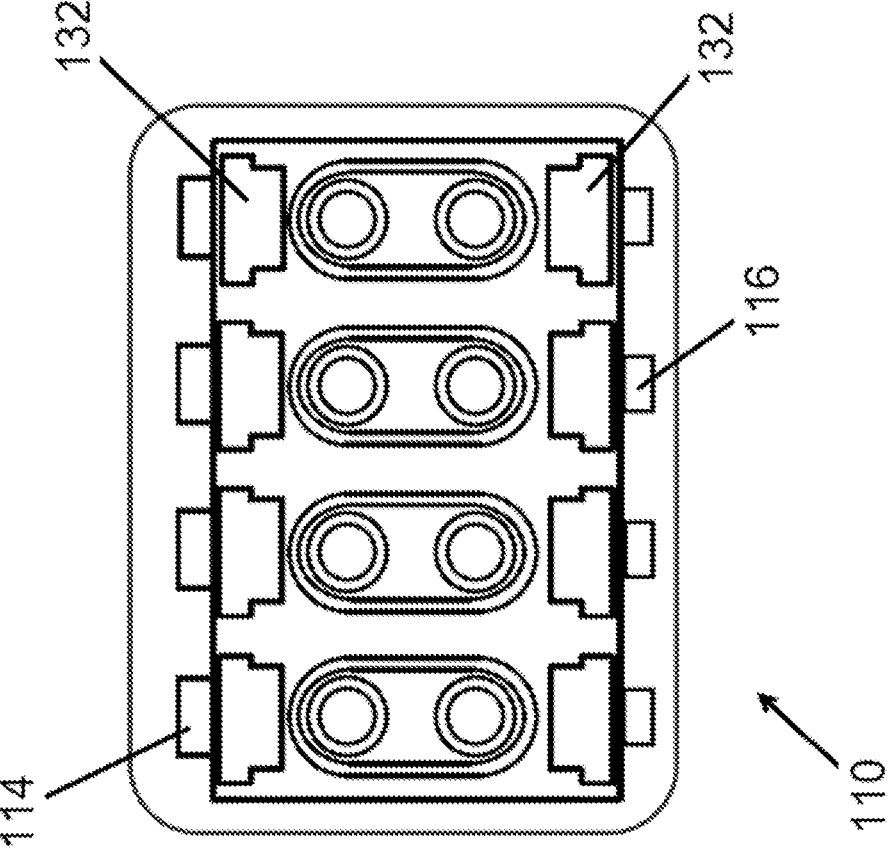

FIG. 10
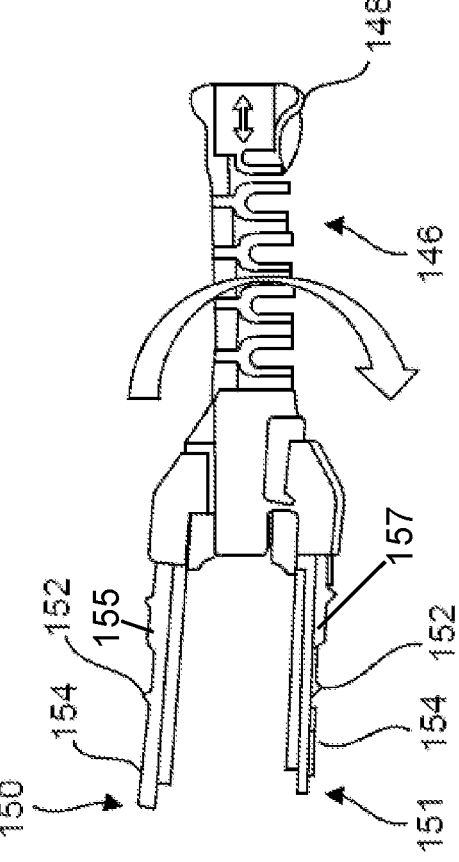
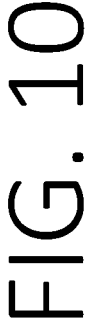
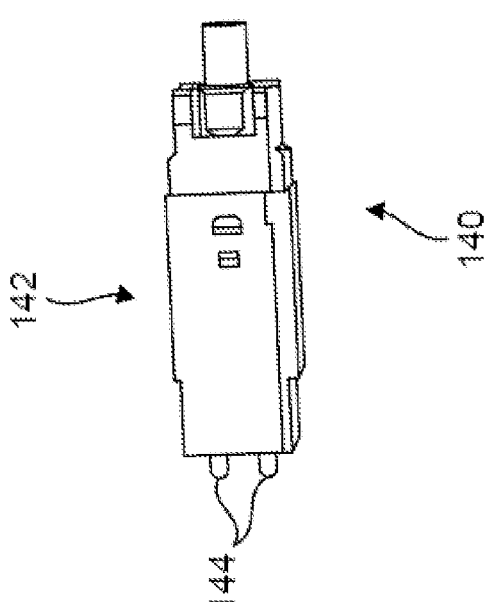

FIG. 11
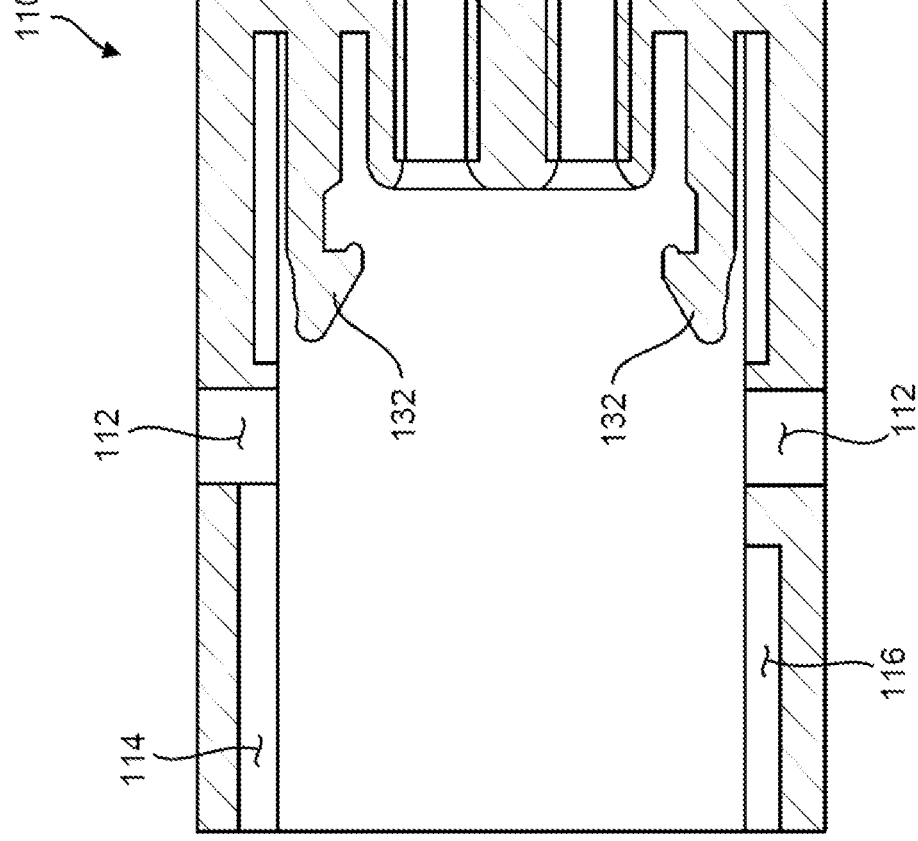

FIG. 12
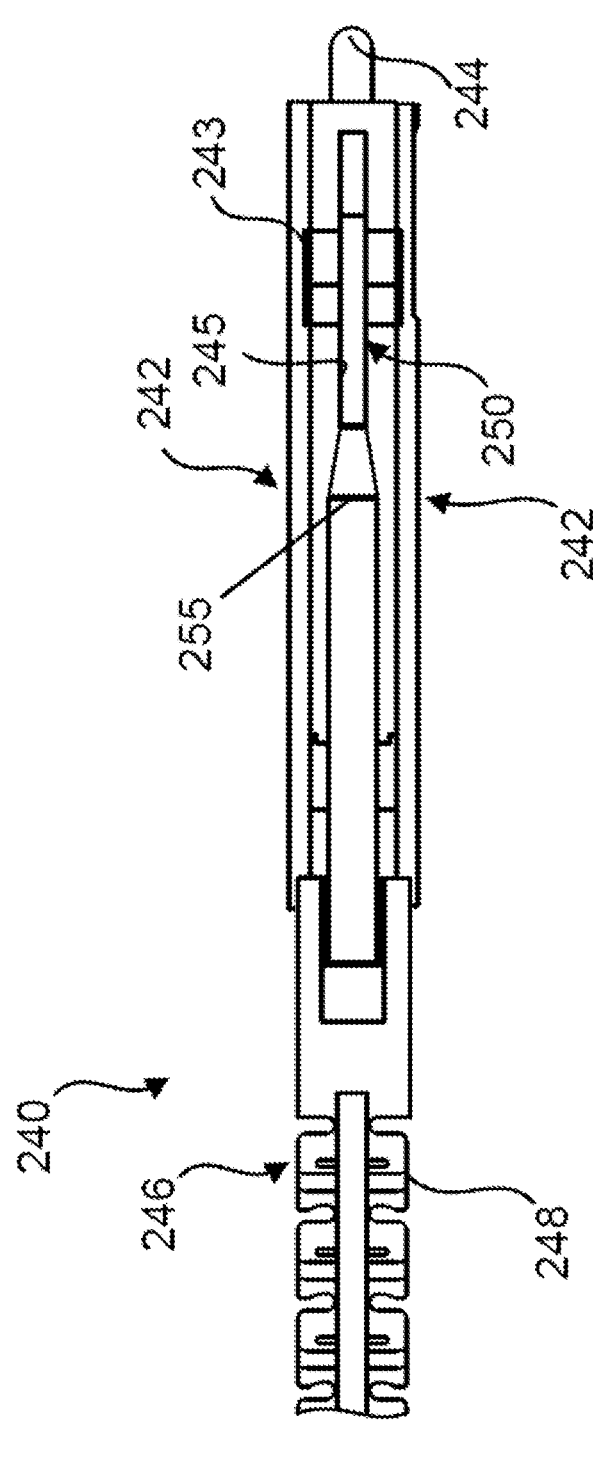

Figure 13:
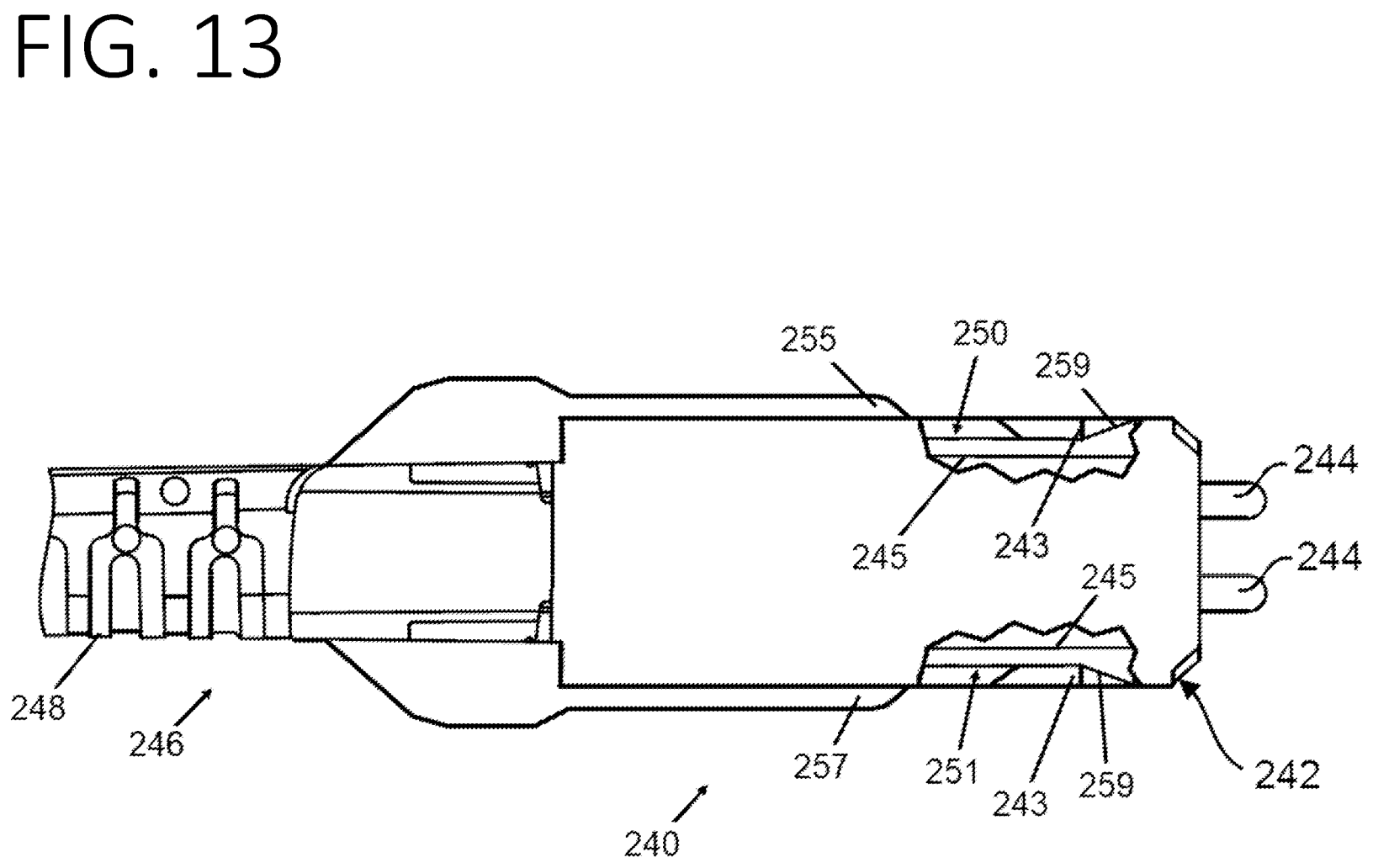

Figure 14:
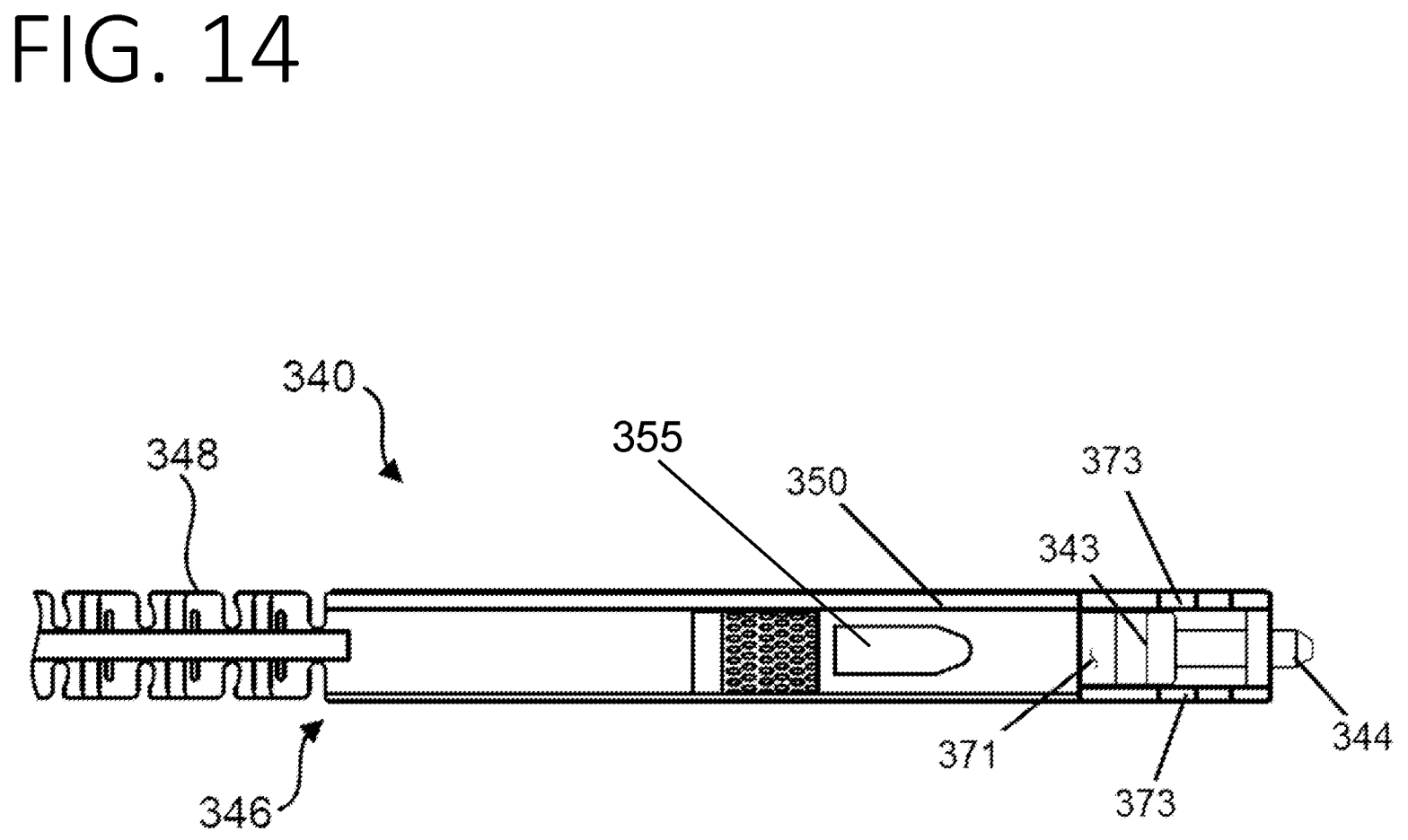

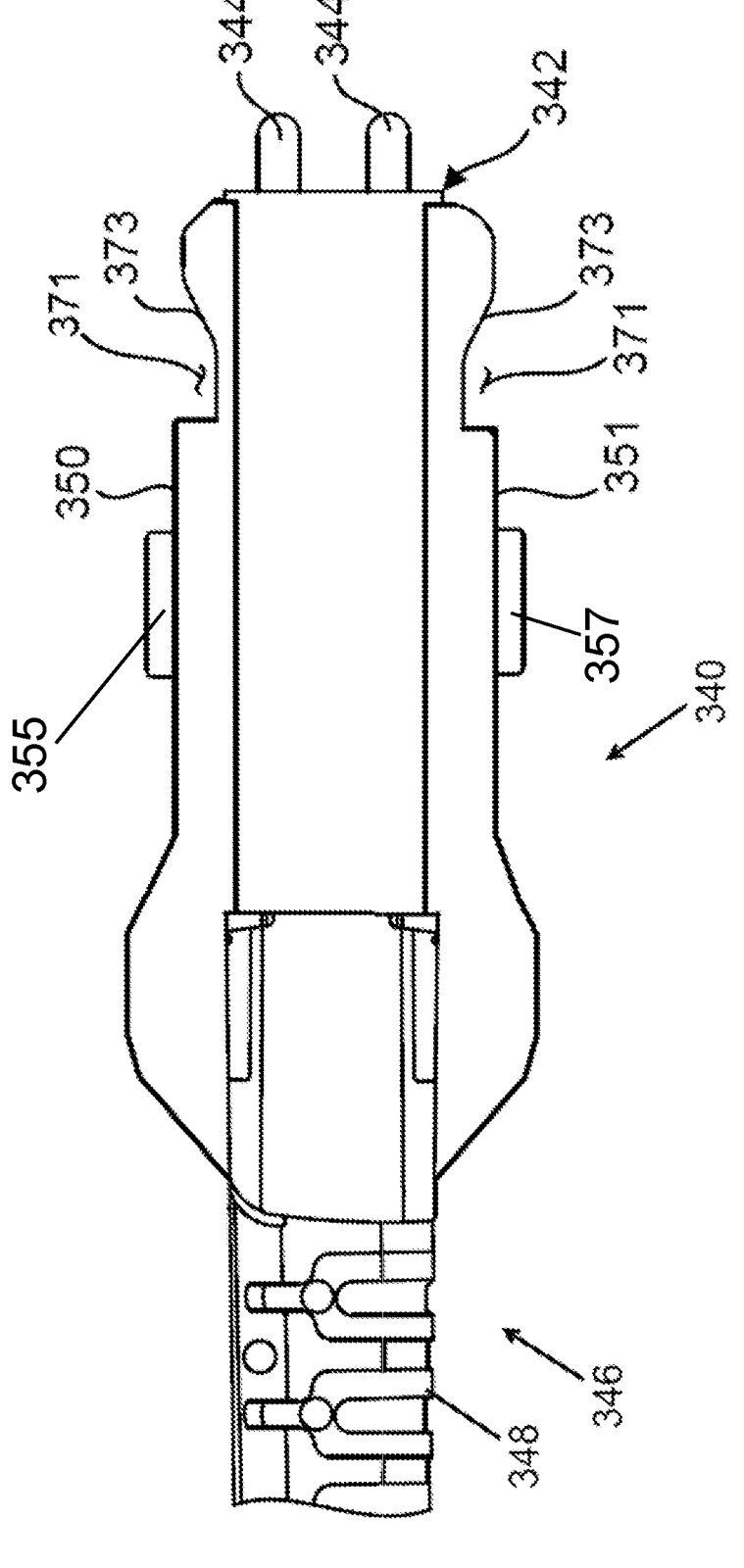
FIG. 15

FIG. 16
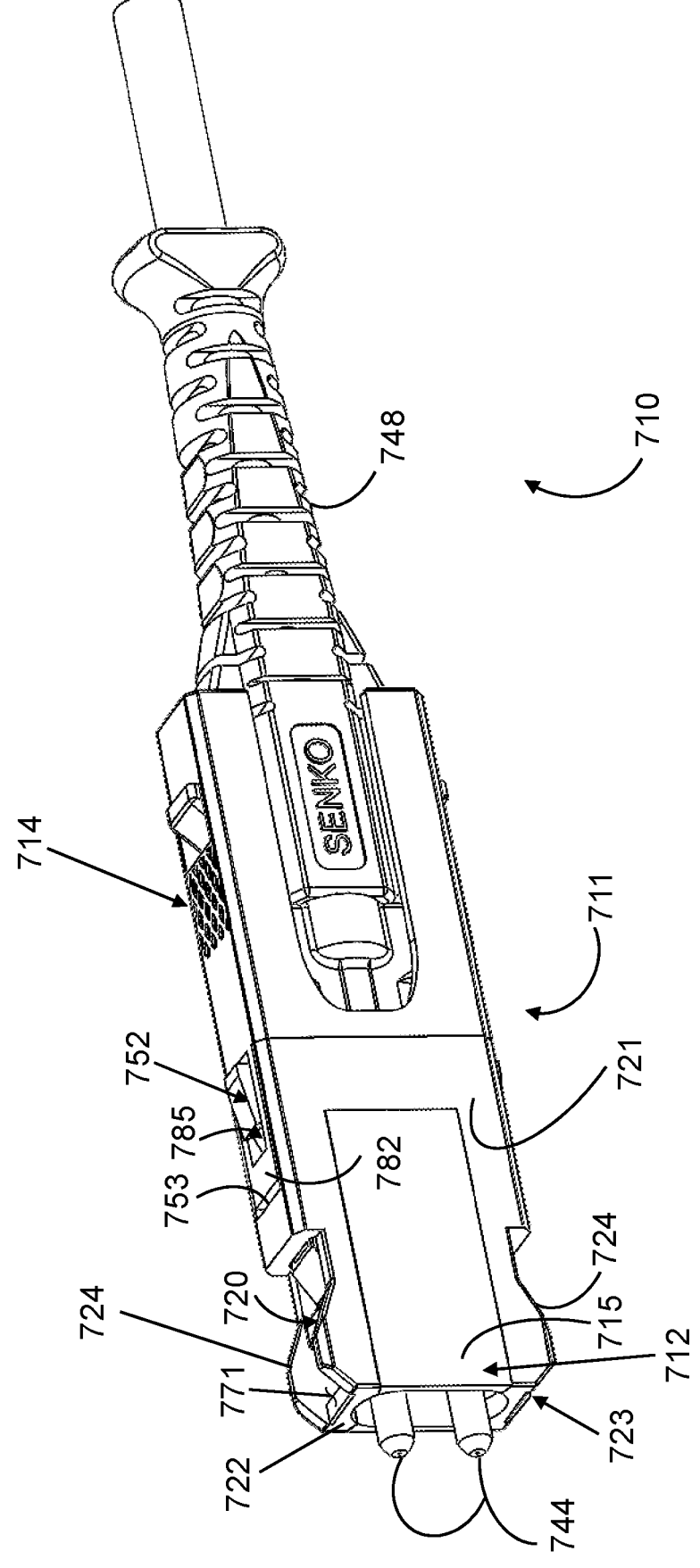

FIG. 17
710
748
714
752
SENKO
711
752
713
712
724 713
724
715
722
723
744

FIG. 18
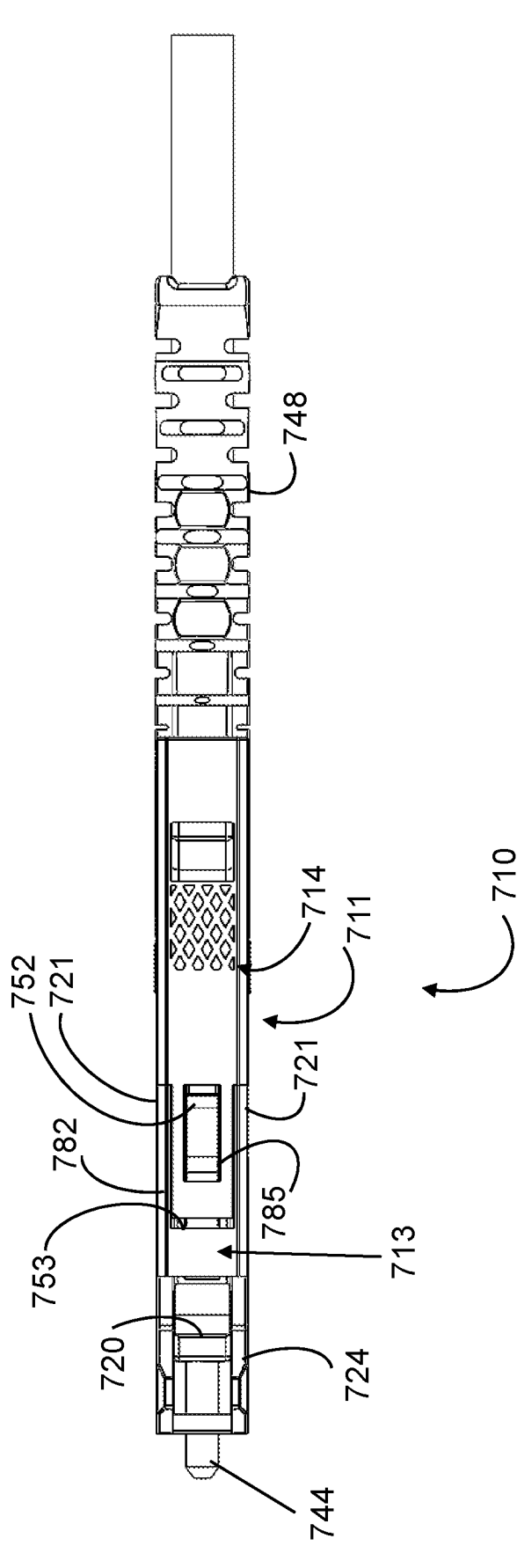

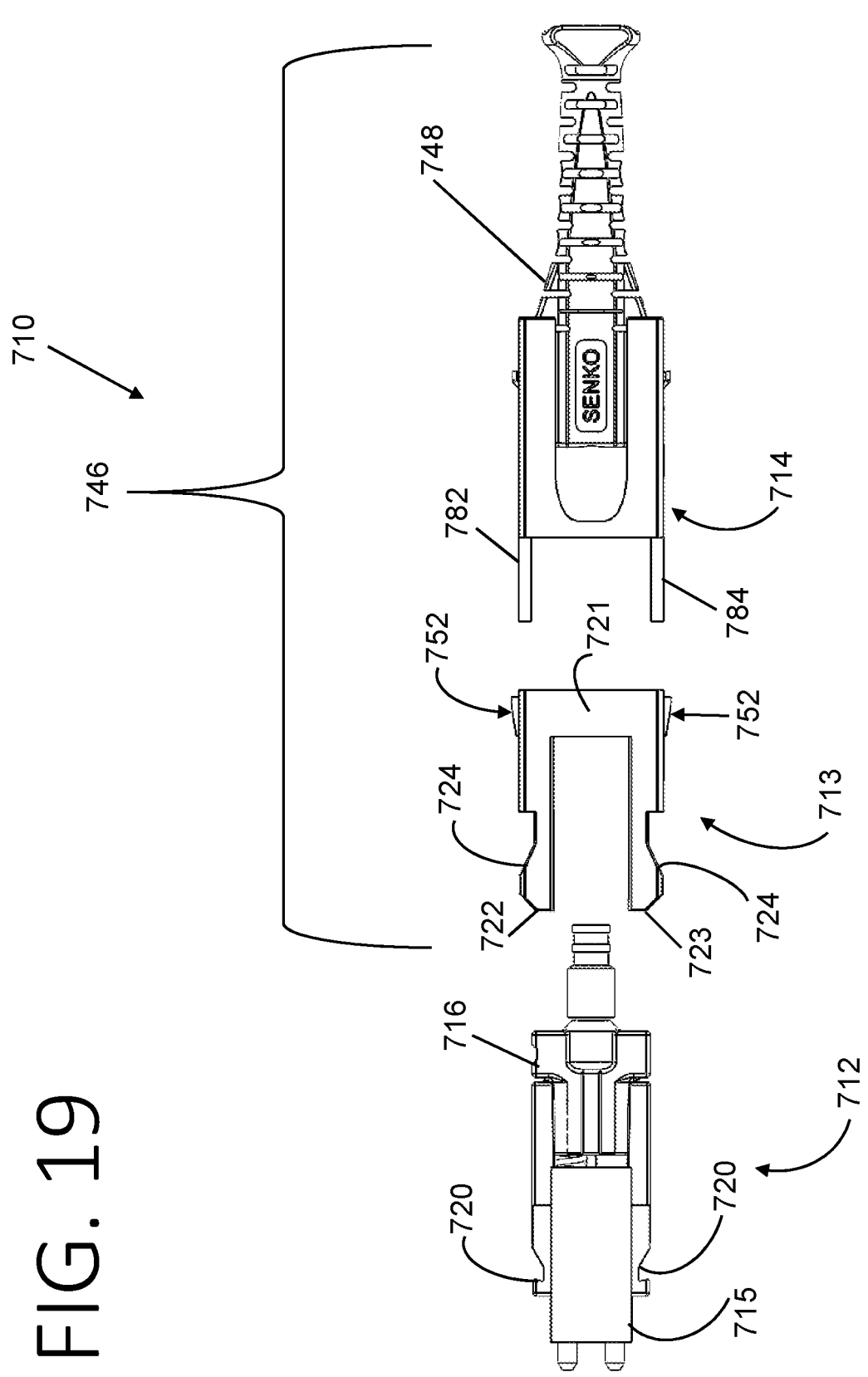
FIG. 19

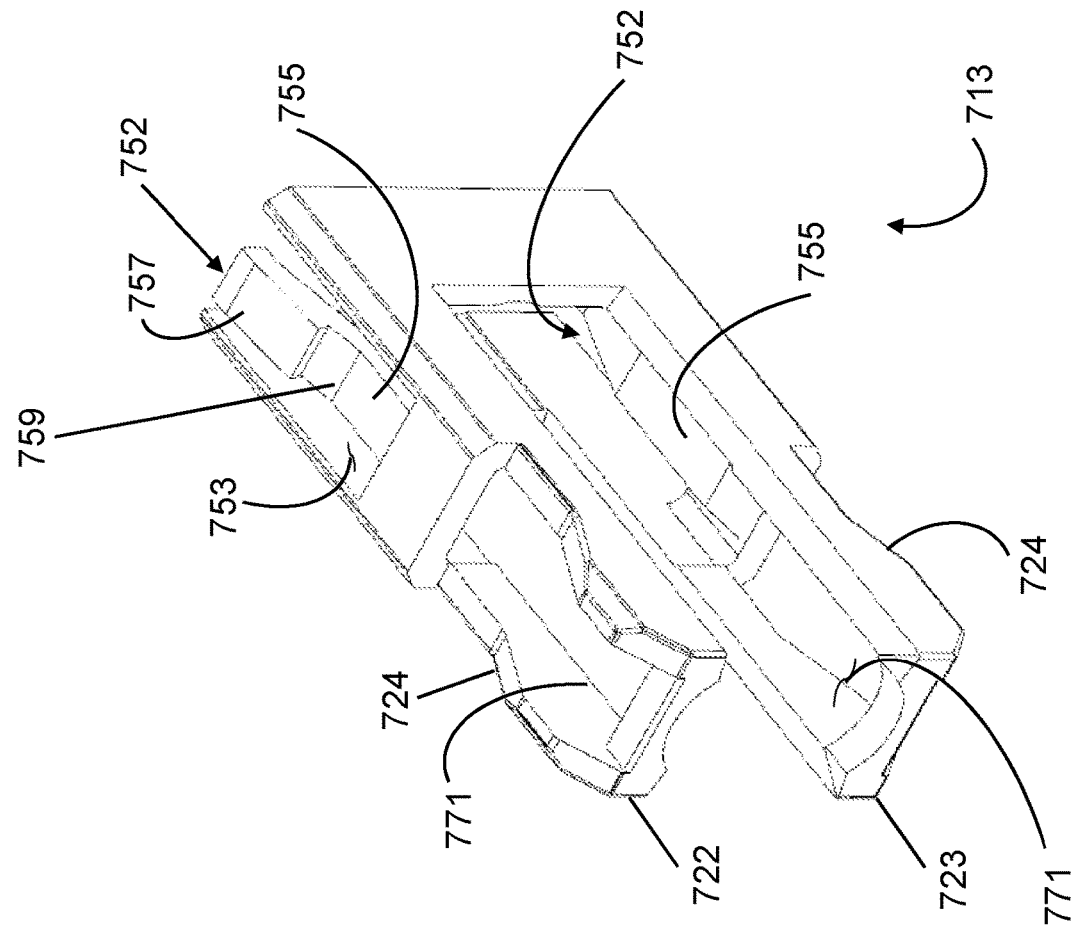
FIG. 19A

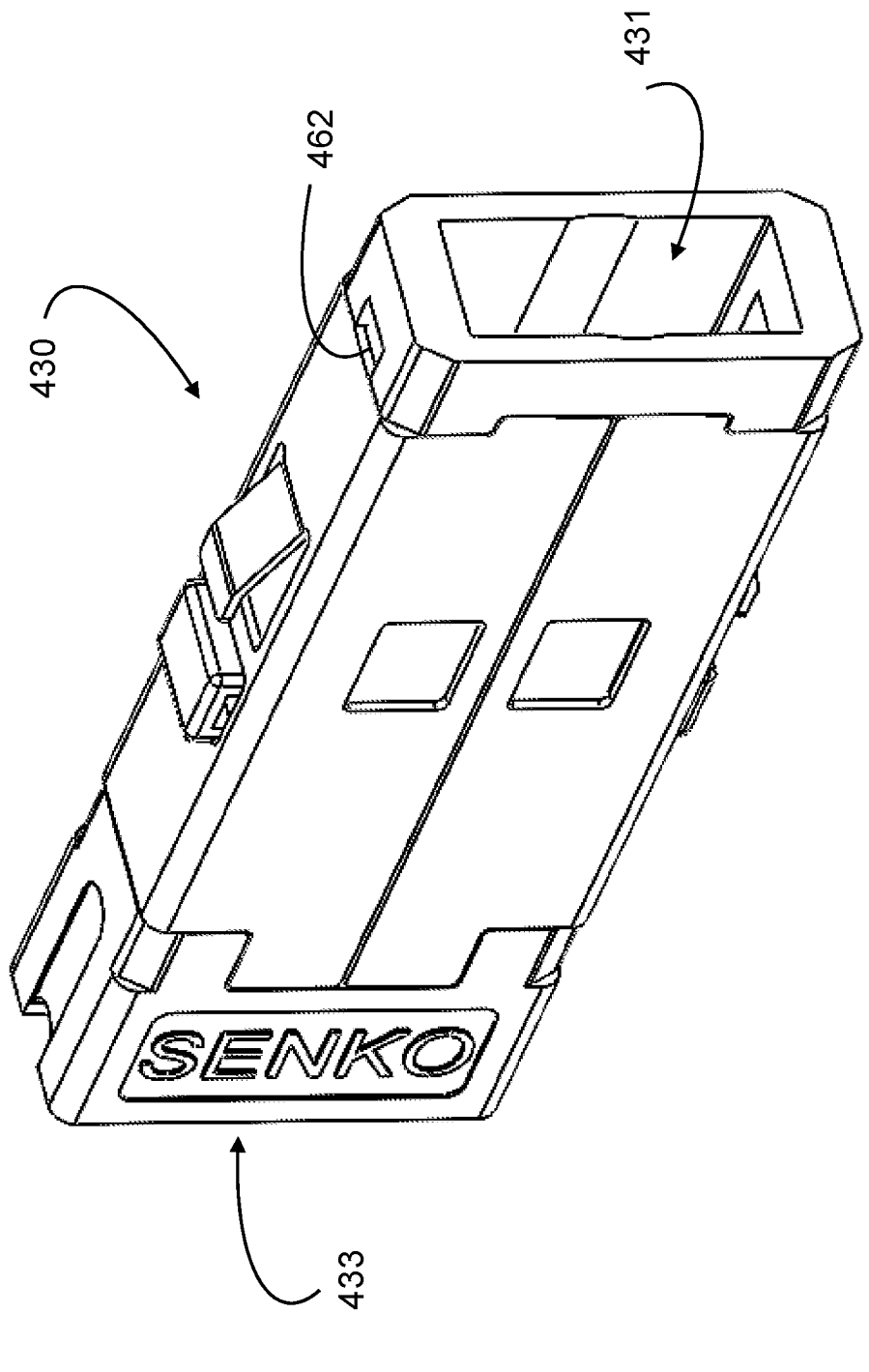
FIG. 20

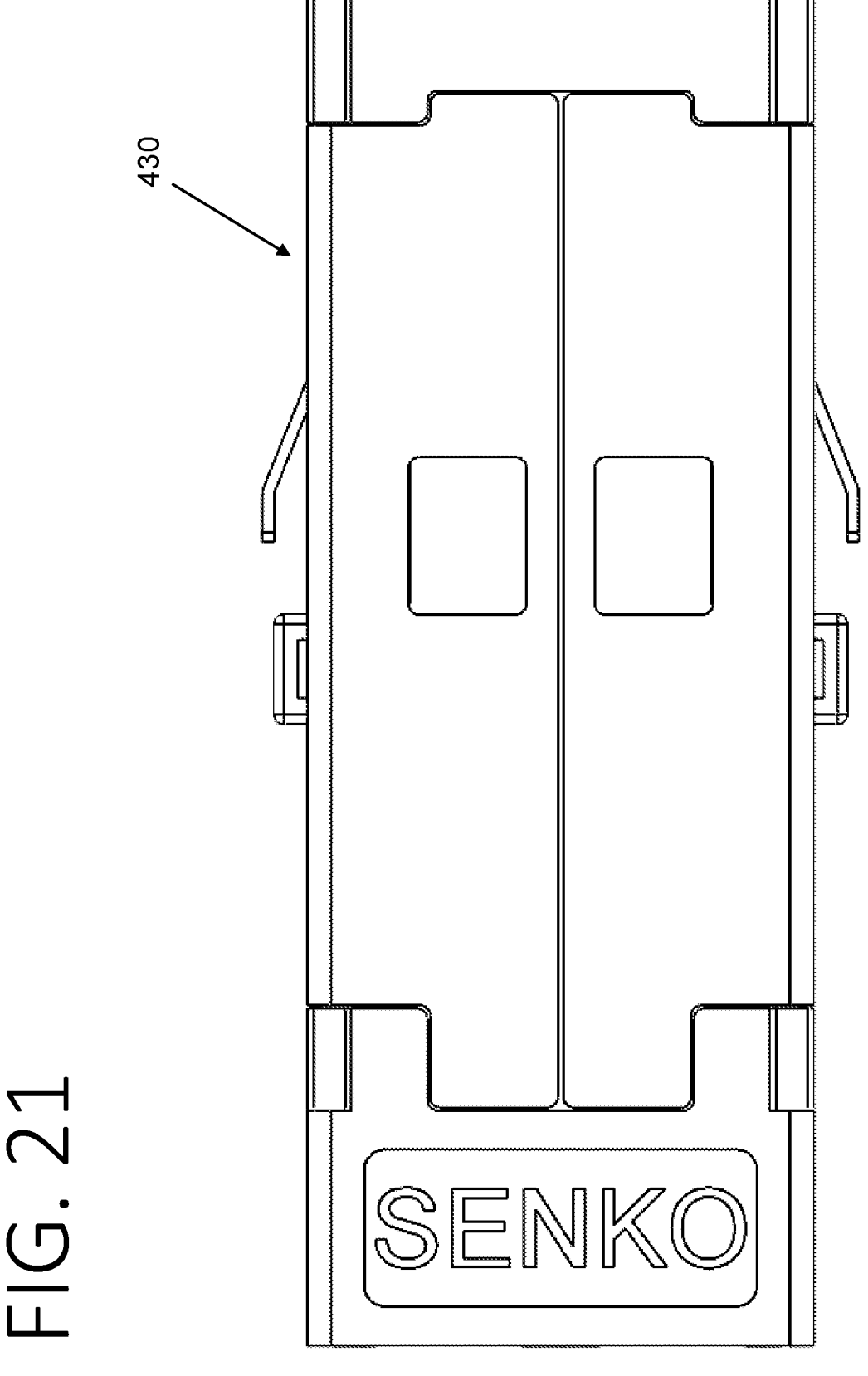
FIG. 21

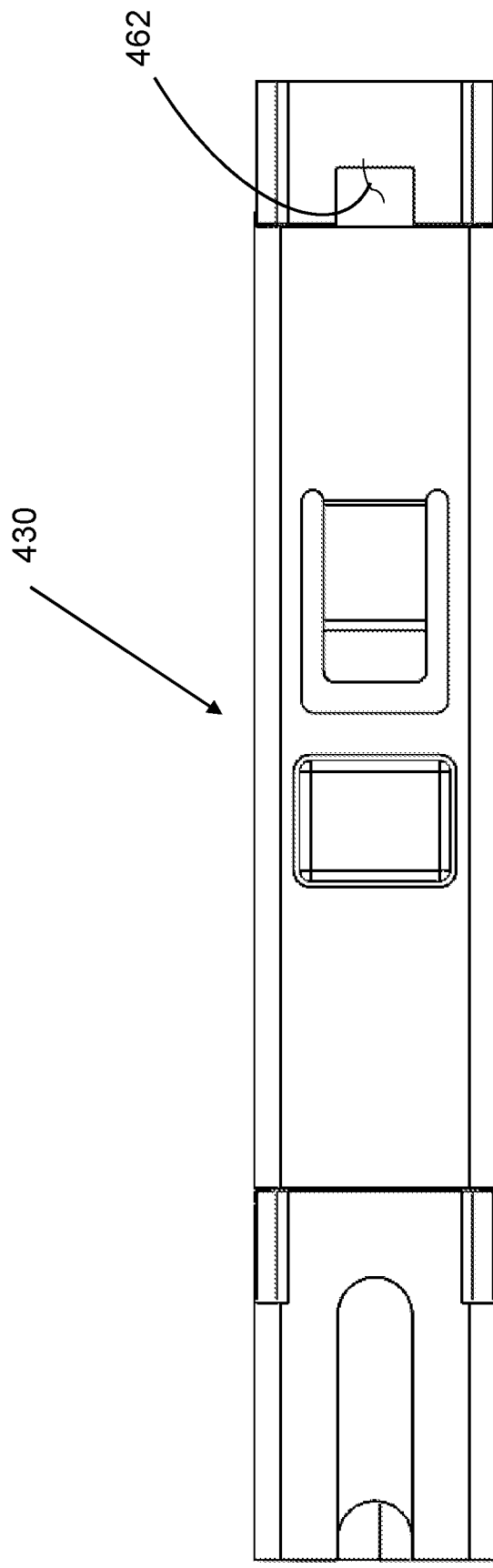
FIG. 22

FIG. 23
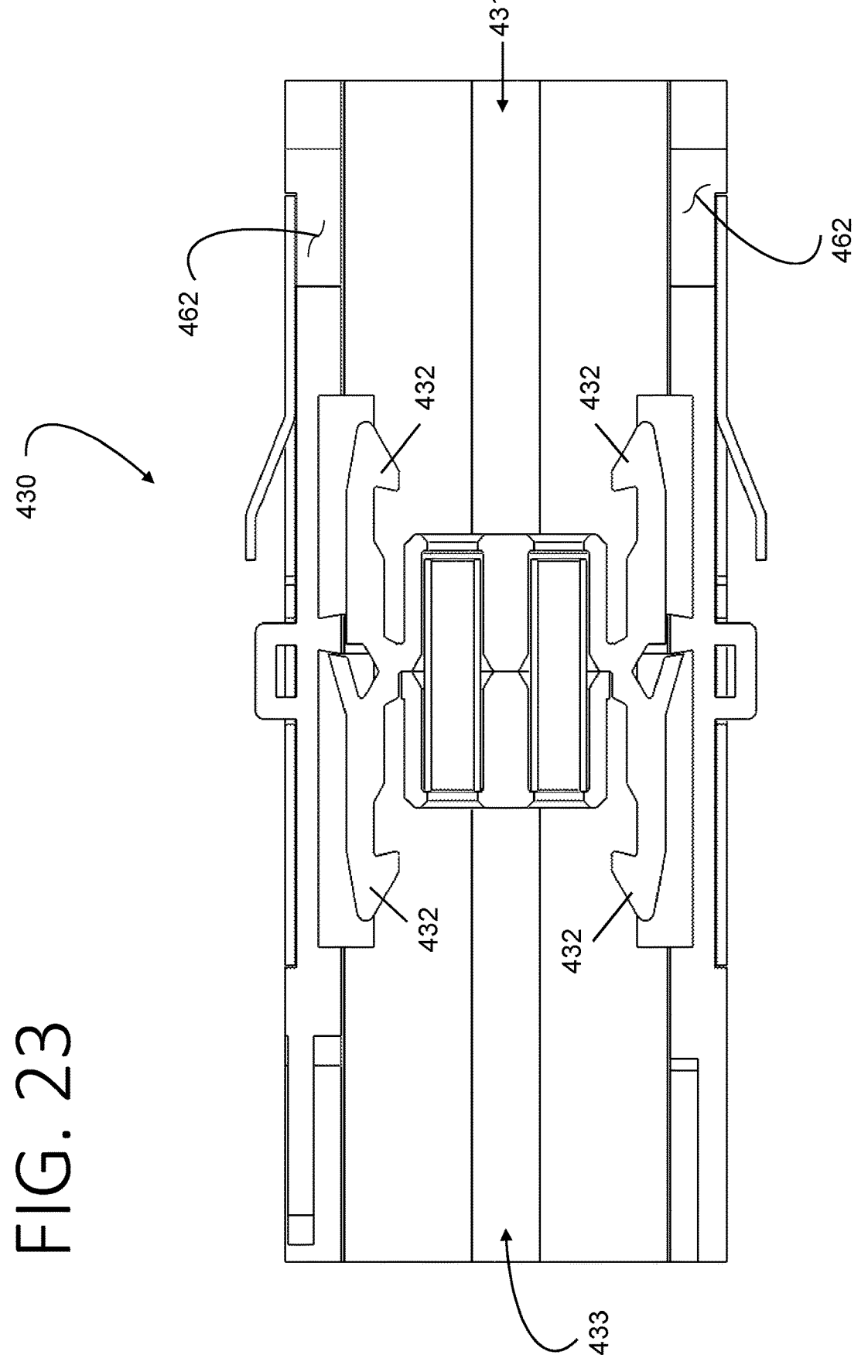

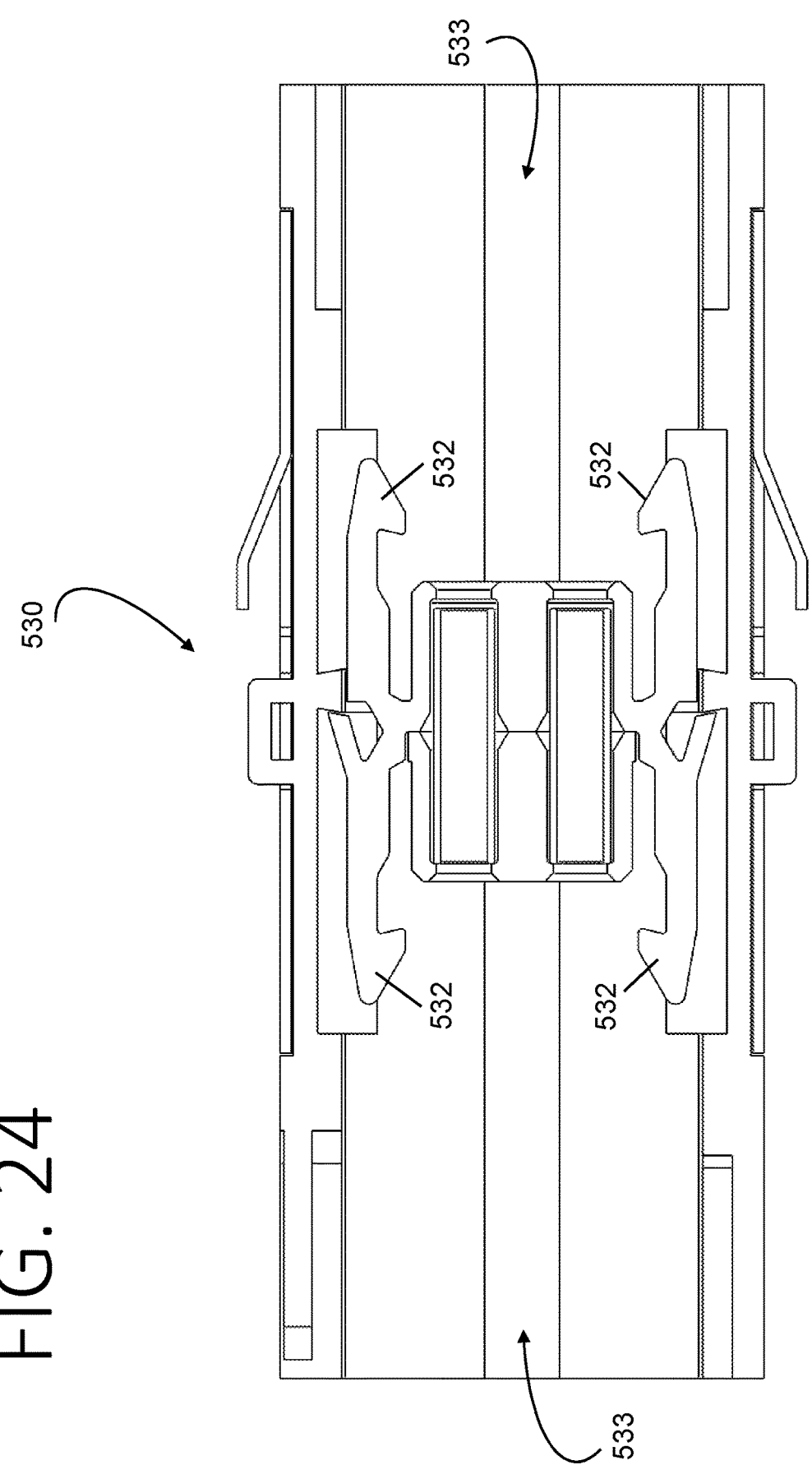
FIG. 24

FIG. 25
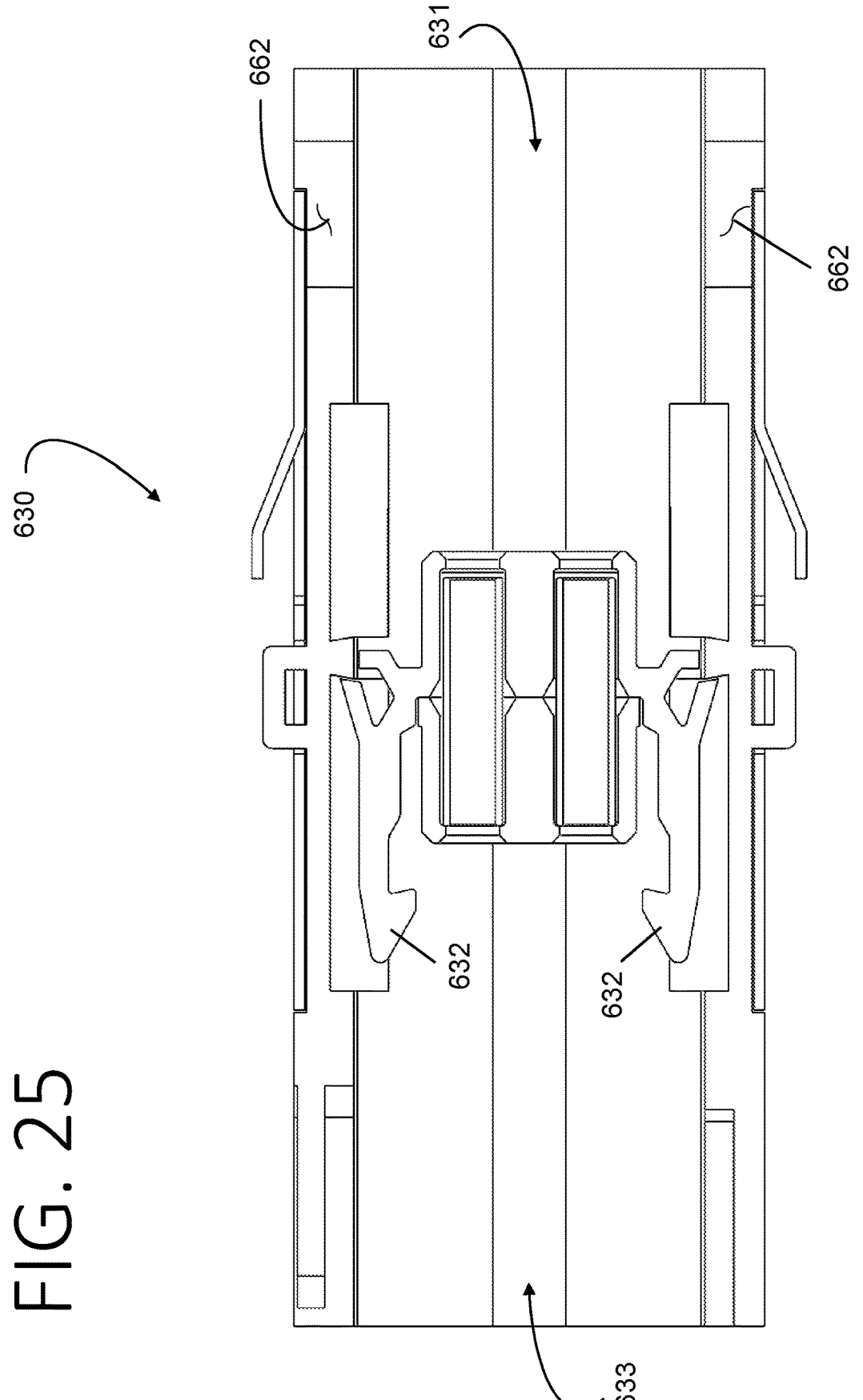

FIG. 26
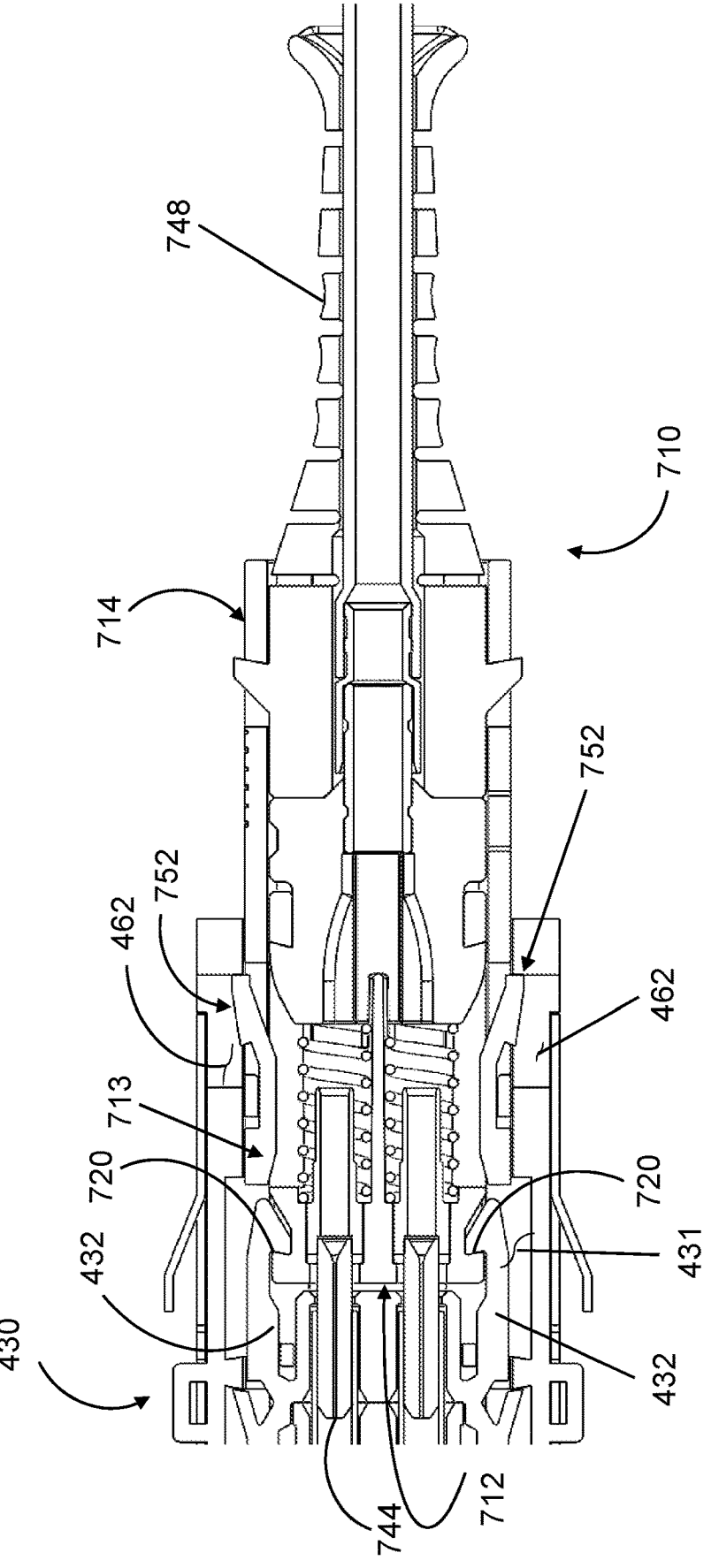

FIG. 27

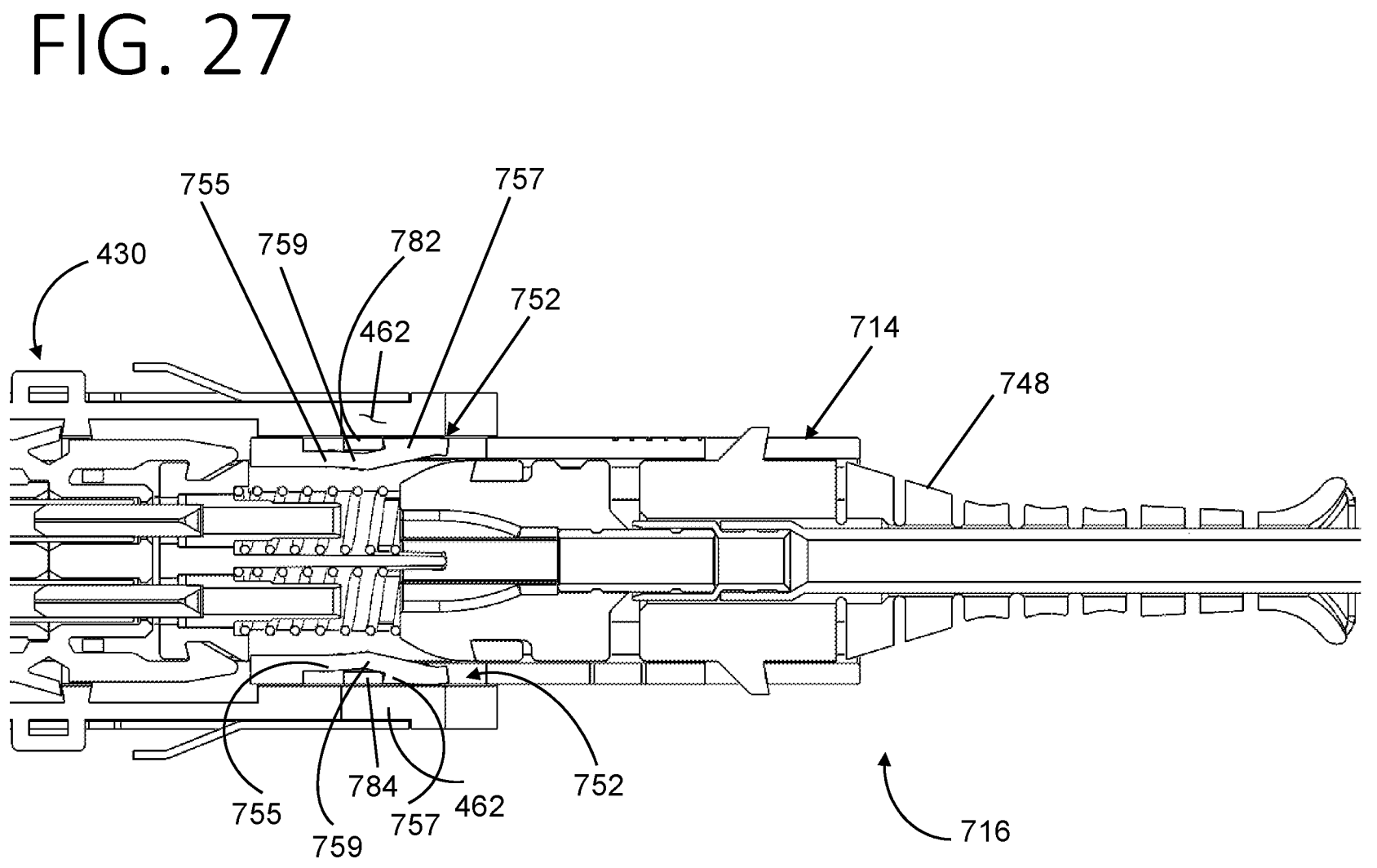

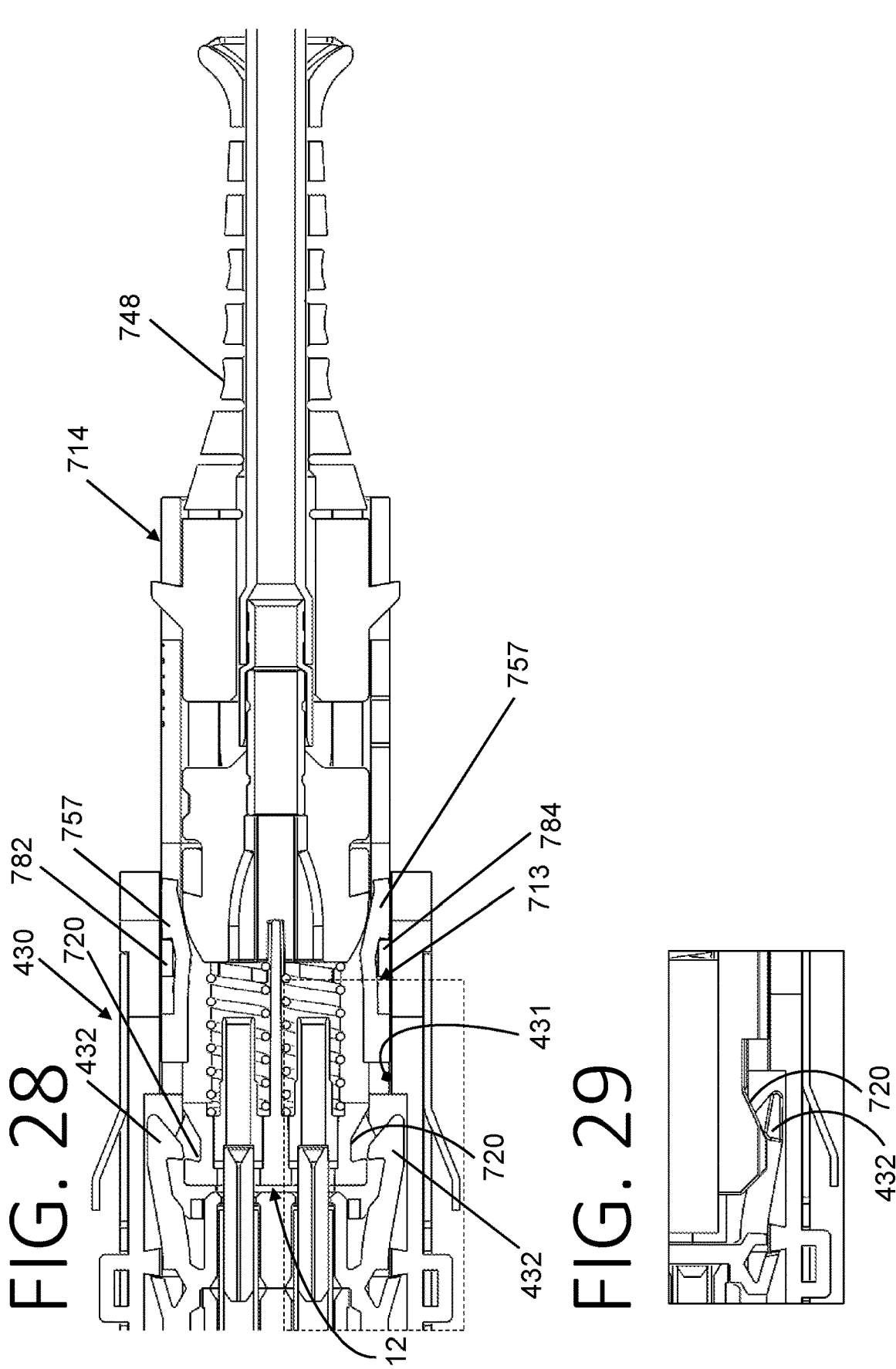
FIG. 28
FIG. 29

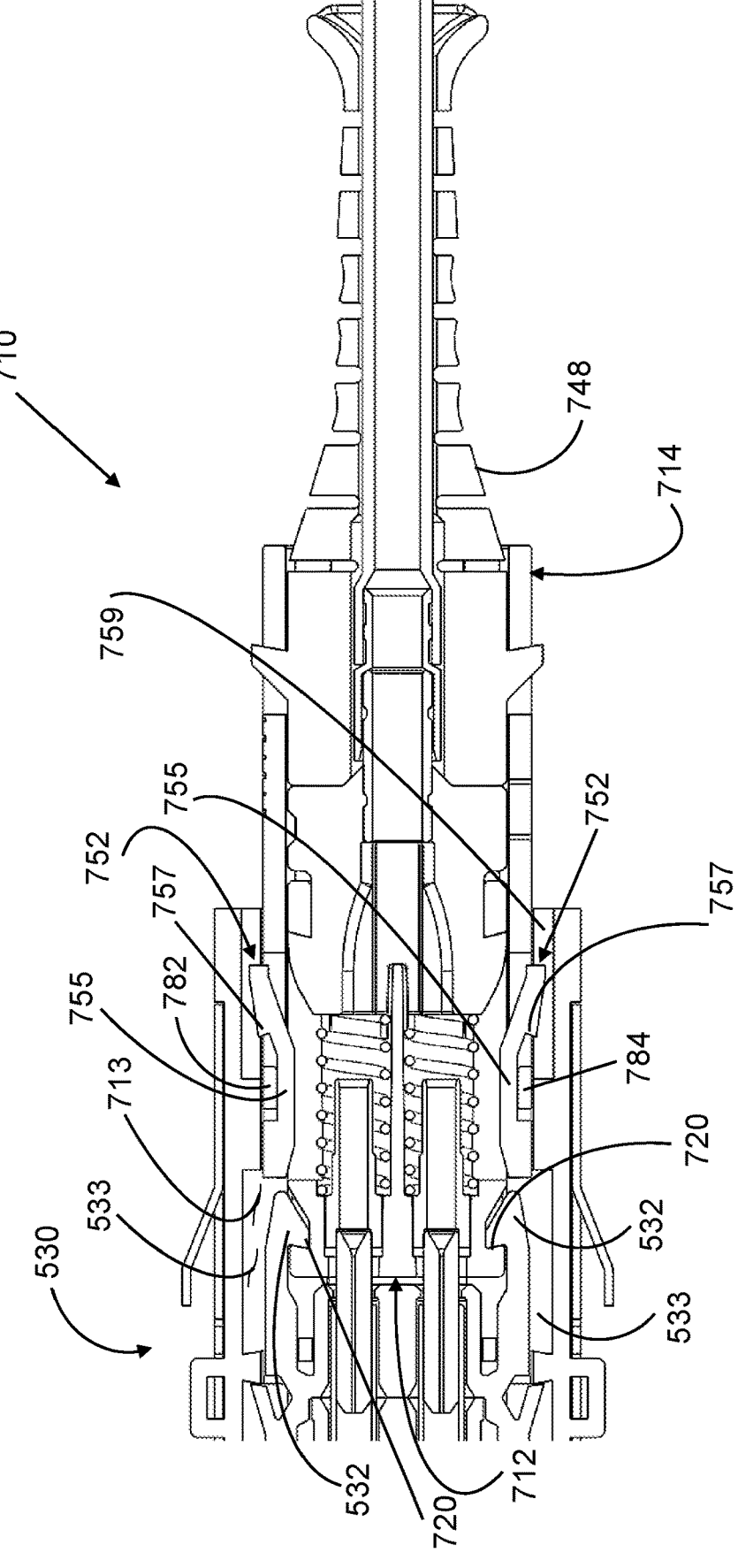
FIG. 30

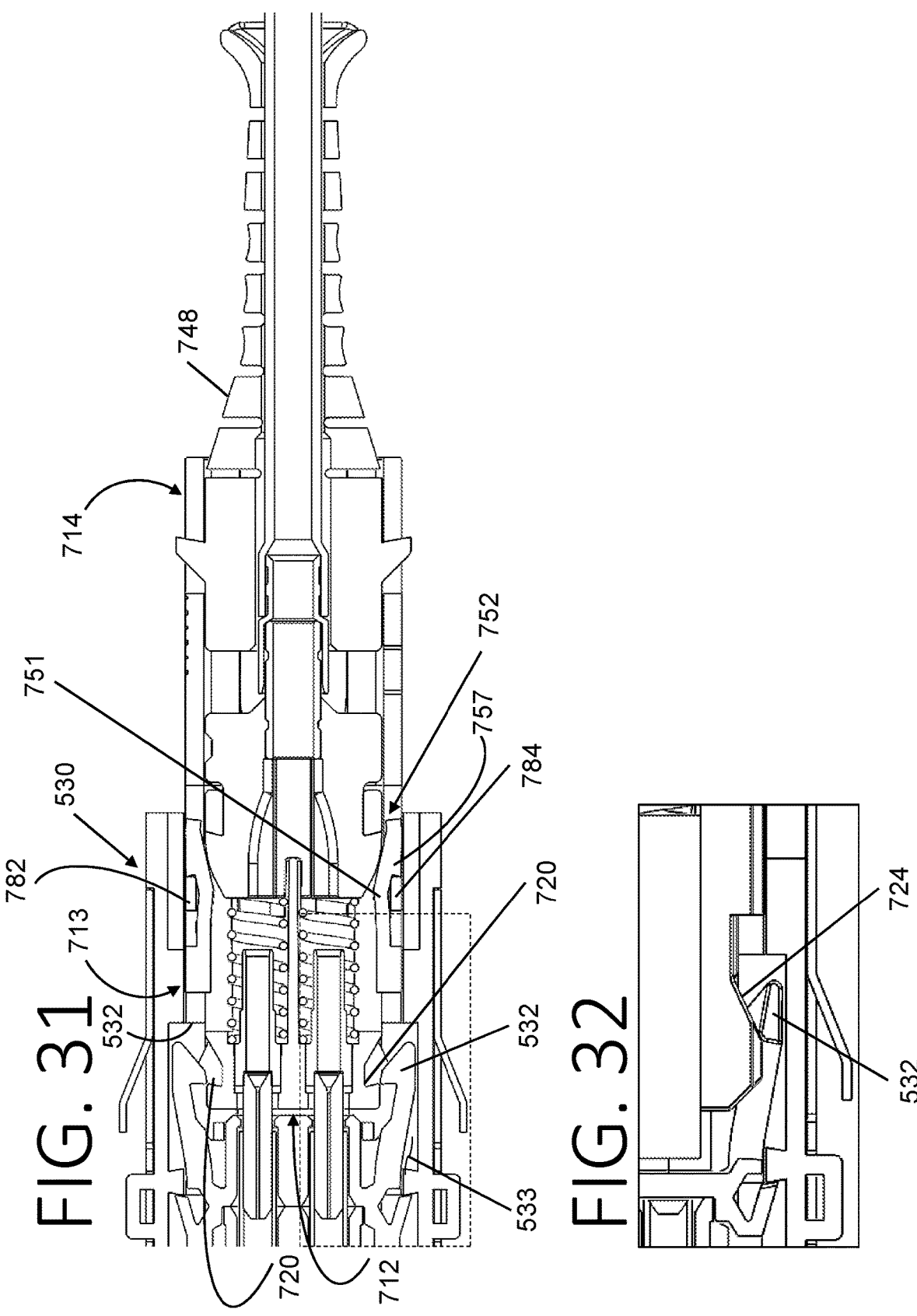
FIG. 31
FIG. 32

FIG. 33
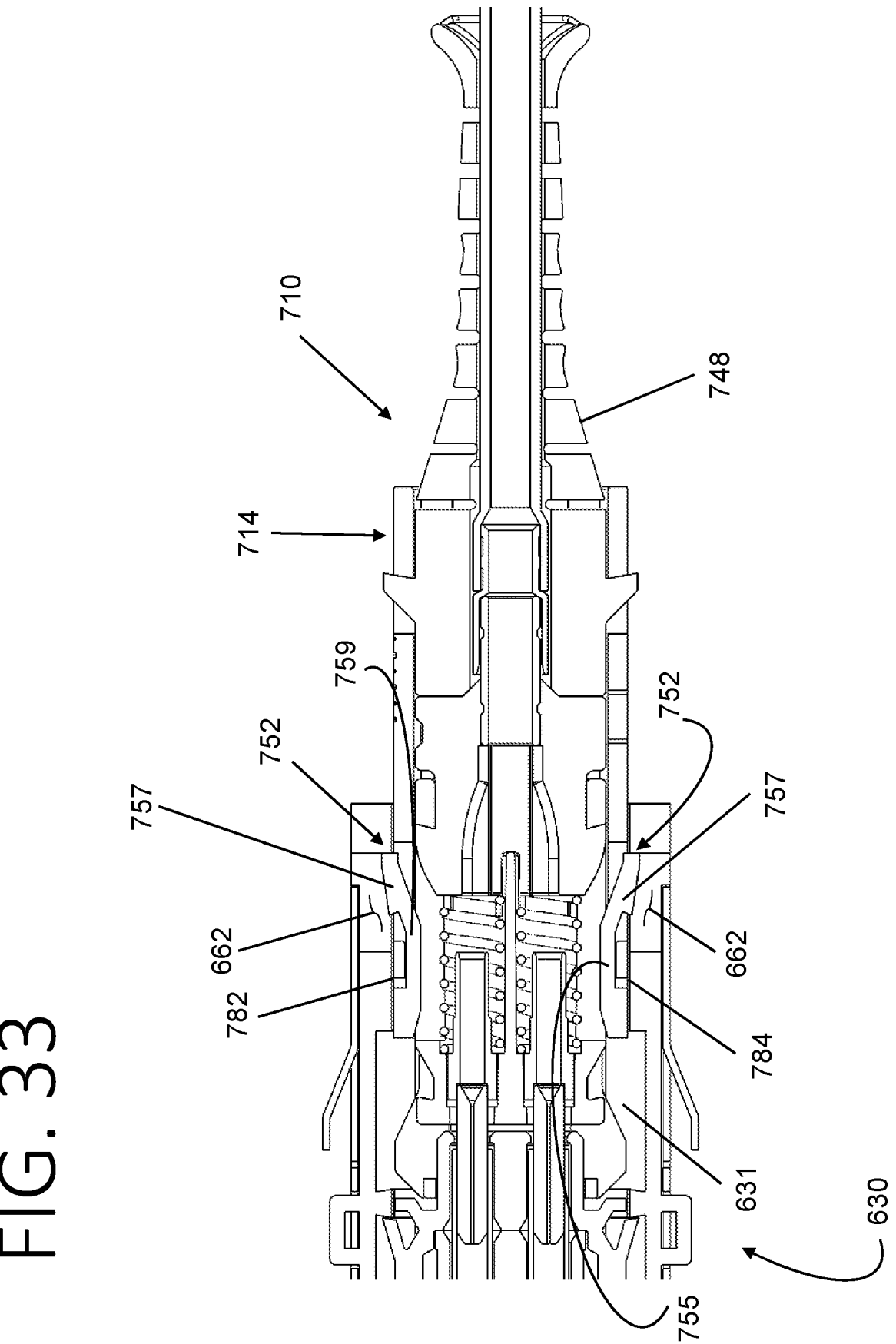

FIG. 34
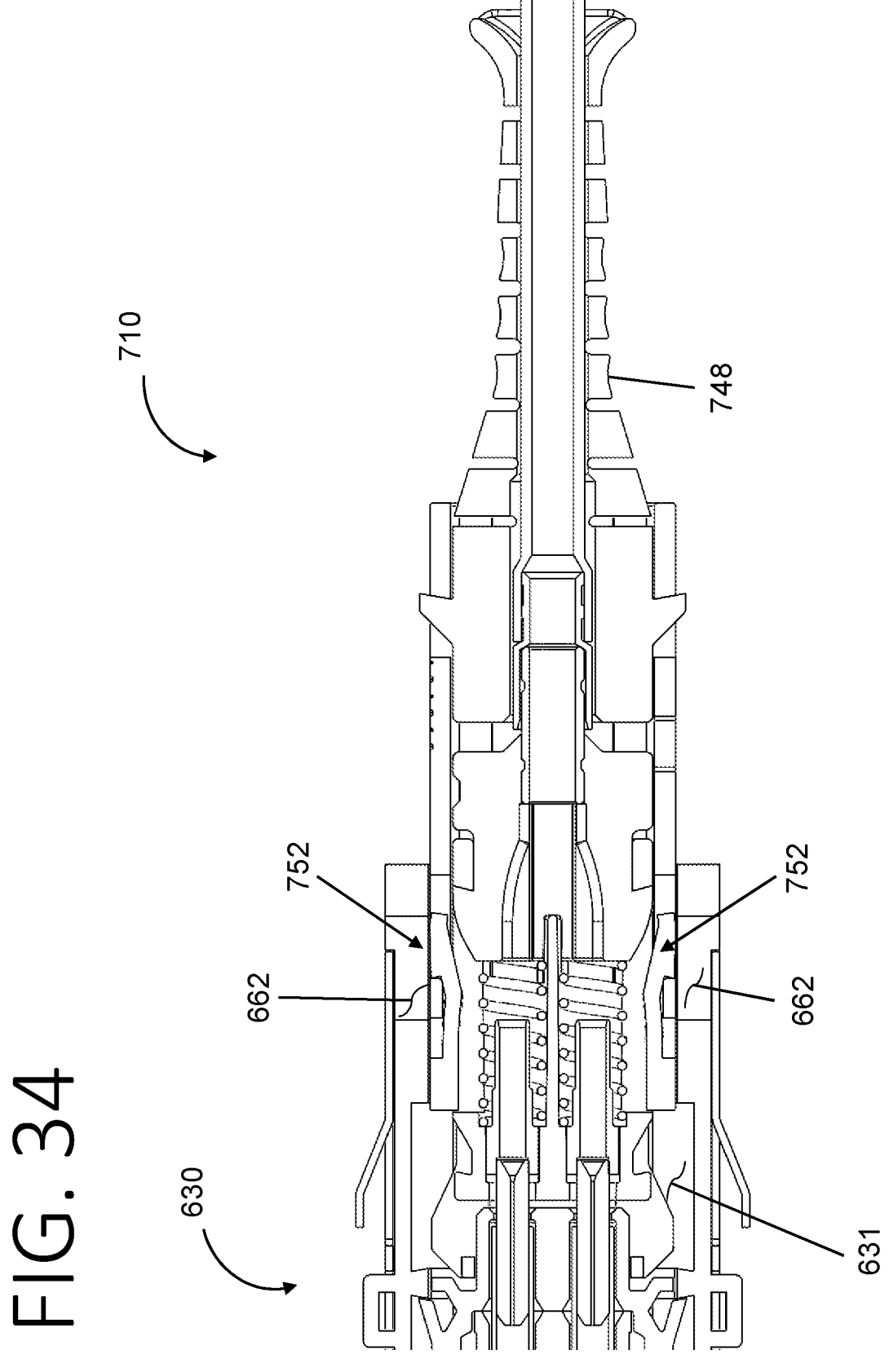

FIG. 35

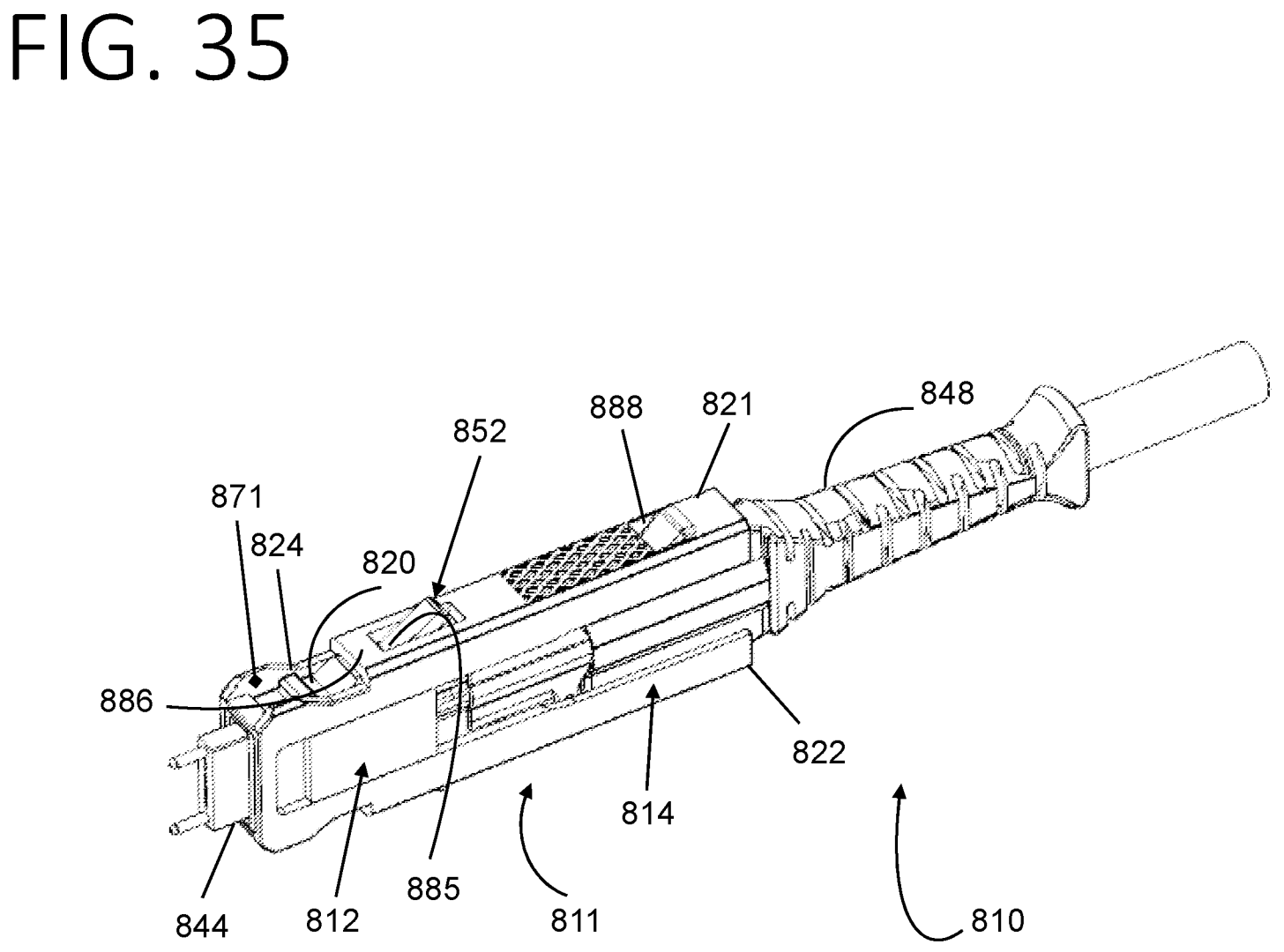

FIG. 36
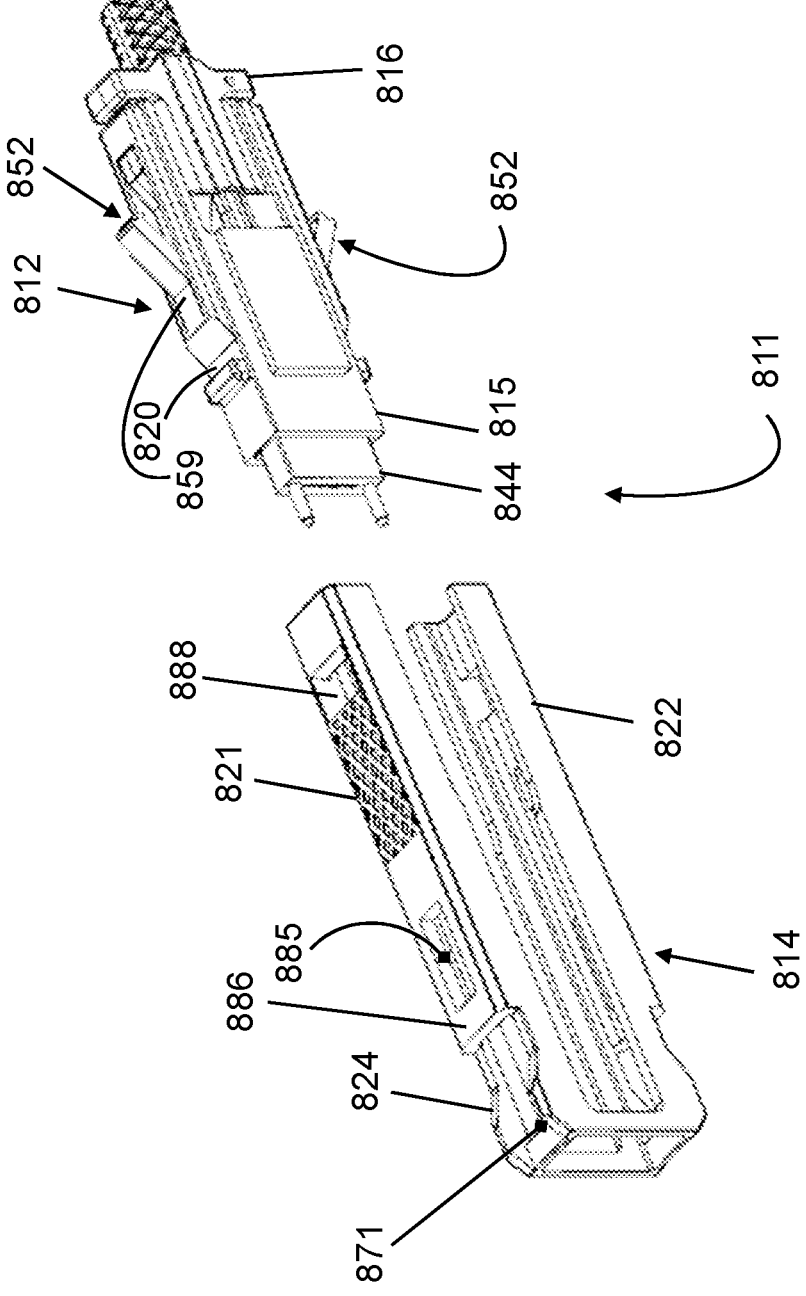

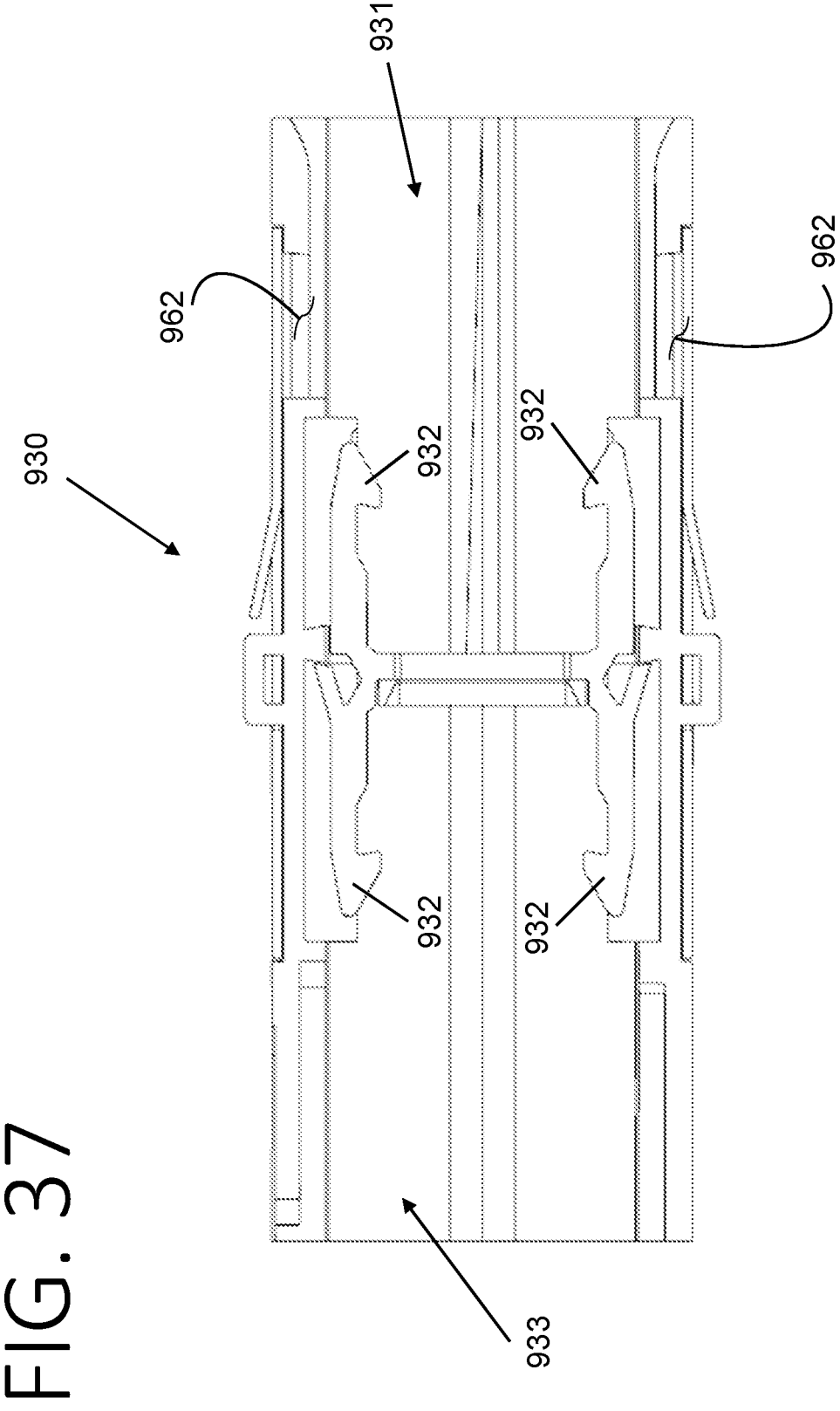
FIG. 37

FIG. 38
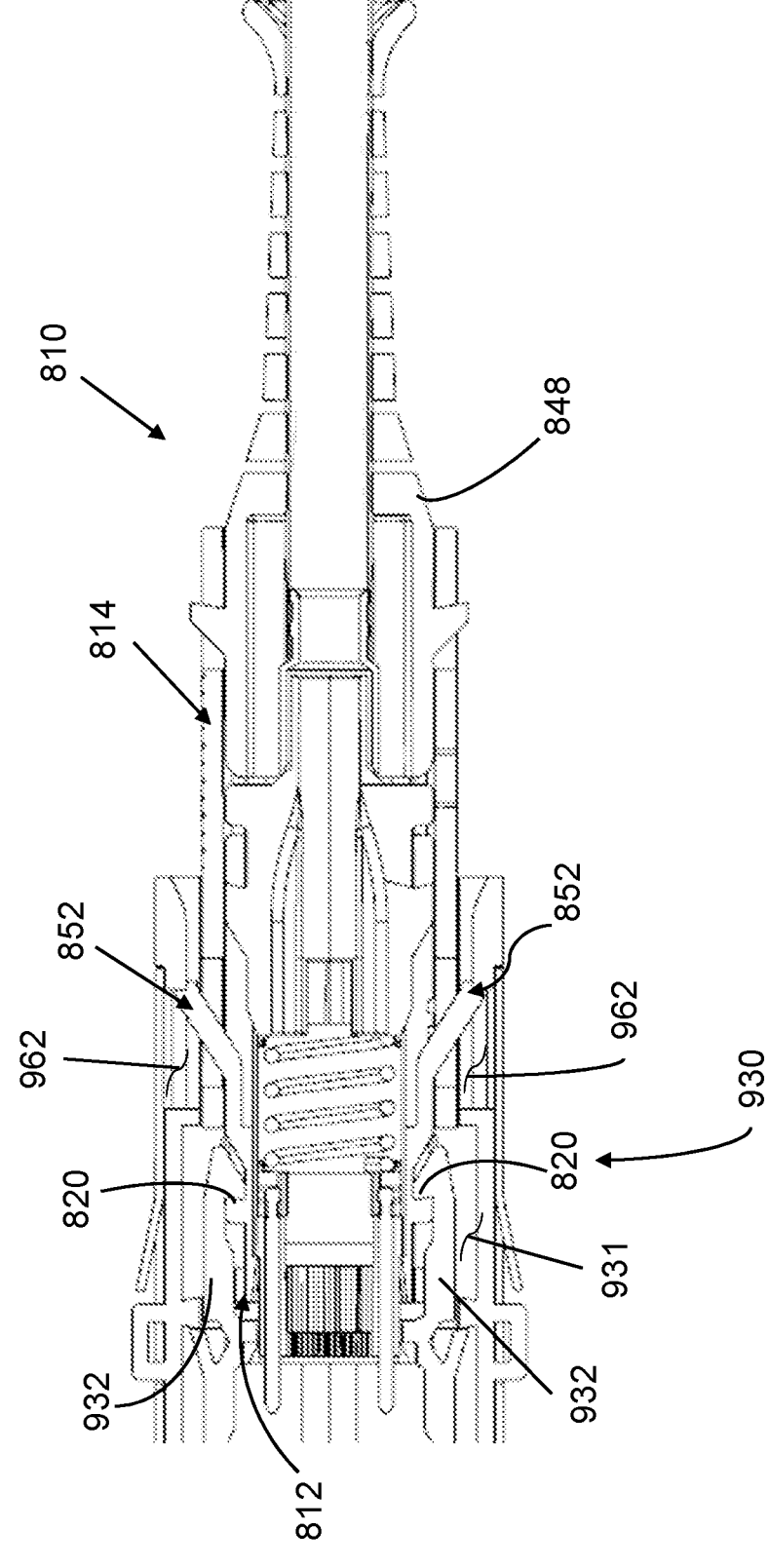

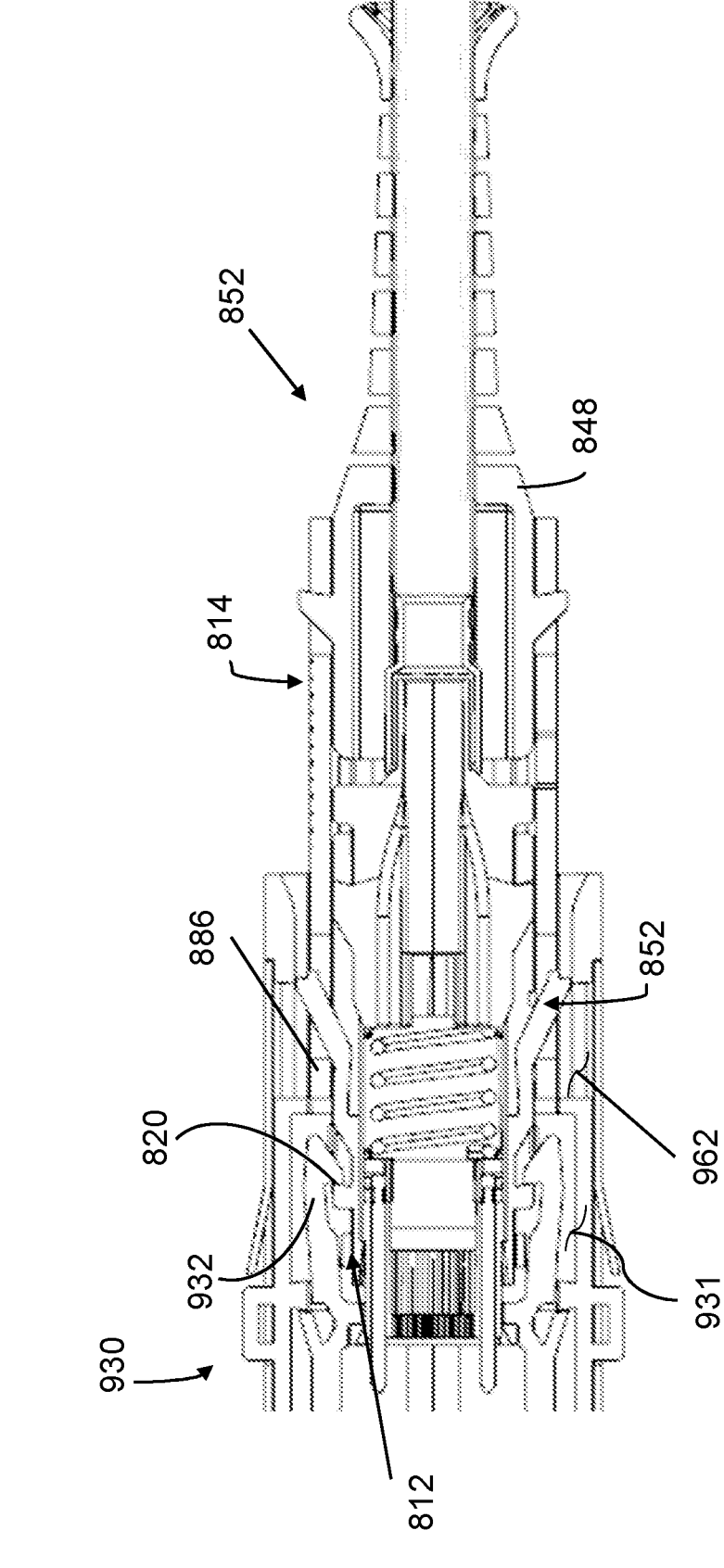
FIG. 39

FIG. 40

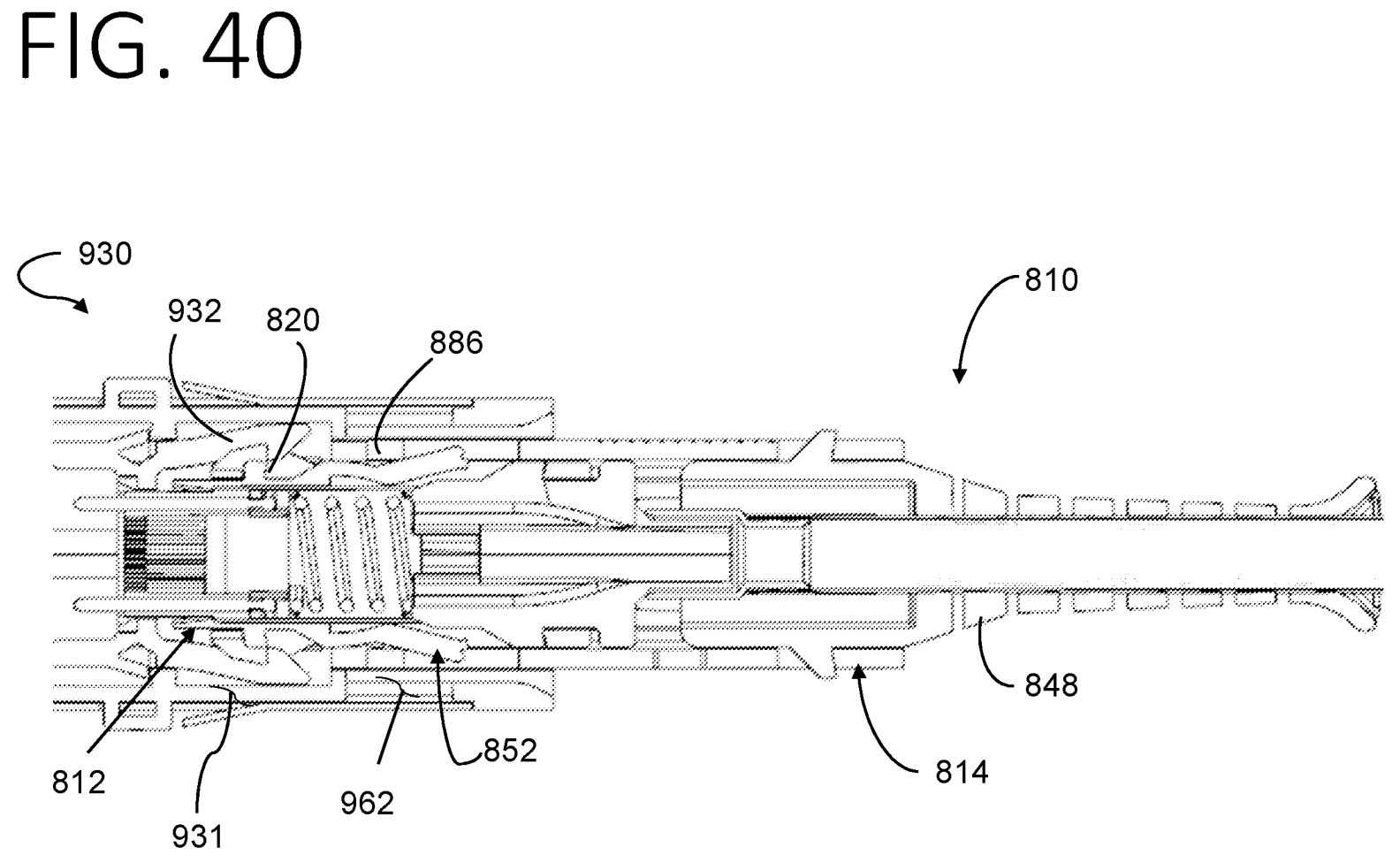

VSFF CONNECTOR AND ADAPTER

CROSS-REFERENCE TO RELATED APPLICATION

This application claims priority to U.S. Provisional Patent Application No. 63/370,060, filed Aug. 1, 2022, which is hereby incorporated by reference in its entirety for all purposes.

BACKGROUND

There is a need for a very small form factor (VSFF) optical connection system to support next generation data center development. Various VSFF solutions have been proposed. The industry's focus is now on two VSFF connection systems: the SN-type connection system (including SN and SN-MT connection system components and the MDC/MMC-type connection system (including MDC/ MMC connection system components). Both the SN-type connection system and the MDC/MMC-type connection systems encompass duplex connector components and MT connector components. The VSFF duplex connectors (called "SN" and "MDC" connectors, respectively) comprise first and second single-fiber ferrules (1.25 mm LC ferrules) stacked one above the other in a connector housing. The VSFF MT connectors (called "SN-MT" and "MMC" connectors, respectively) have one MT ferrule in a connector housing arranged so that a row of fibers in the MT ferrule extends in a vertical line. Although both the SN-type connection system and the MDC/MMC-type connection system include connectors of roughly the same footprint and fiber end face layout, the connectors and adapters are not cross-compatible. The inventors believe that VSFF adoption would be accelerated if there was cross-compatibility between the SN-type connection system and the MDC/ MMC-type connection system.

SUMMARY

In one aspect, a VSFF optical fiber connector comprises a connector housing having a top portion and a bottom portion. A ferrule arrangement terminates a plurality of optical fibers. The ferrule arrangement comprises one of (i) a pair of spring-loaded single-fiber ferrules and (ii) a single spring-loaded MT ferrule. The ferrule arrangement is received in the connector housing such that the optical fibers are spaced apart vertically between the top portion and the bottom portion of the connector housing. A connector latch recess is configured for latching with an adapter latch arm of a mating adapter of a first type. A connector latch is configured for latching with an adapter latch recess of a mating adapter of a second type.

In another aspect, an optical fiber adapter for one or more VSFF connectors comprises a top wall defining an upper latch recess configured to latch with a first depressible latch of a first type of VSFF connector. A bottom wall defines a lower latch recess configured to latch with a second depressible latch arm of the first type of VSFF connector. A pair of opposing latch arms is configured to latch with upper and lower latch recesses of a second type of VSFF connector.

In another aspect, a VSFF optical fiber connector comprises a connector housing having a top portion and a bottom portion. A ferrule arrangement terminates a plurality of optical fibers arranged in at least one line. The ferrule arrangement comprises one of (i) a pair of spring-loaded single-fiber ferrules and (ii) a single spring-loaded MT ferrule. The ferrule arrangement is received in the connector housing such that the optical fibers of said at least one line are spaced apart vertically between the top portion and the bottom portion of the connector housing. A remote release assembly comprises first and second extenders. The first extender is slidably engaged with the top portion of the connector housing and the second extender is slidably engaged with the bottom portion of the connector housing. The remote release assembly is configured to be displaced rearward in relation to the connector housing. Each extender is configured to unlatch a respective latching connection between the connector housing and a mating adapter as the remote release assembly is displaced rearward in relation to the connector housing.

In yet another aspect, an optical fiber adapter for one or more VSFF connectors comprises a receptacle defining an opening for receiving one or more of the VSFF connectors. The receptacle is configured to receive a first depressible latch of a first type of VSFF connector, for releasably connecting with the first type of VSFF connector. A latching mechanism in the receptacle is configured to be releasably received in a latch recess of a second type of VSFF connector whereby either the VSFF connector of the first type or the VSFF connector of the second type can be received in the opening and releasably connected to the receptacle.

Other aspects and features will be apparent hereinafter.

DESCRIPTION OF THE FIGURES

FIG. 1A is a perspective of an SN duplex connector interface of the prior art;

FIG. 1B is an end elevation of the SN duplex connector interface of FIG. 1A;

FIG. 1C is a side elevation of the SN duplex connector interface of FIG. 1A;

FIG. 1D is a top plan view of the SN duplex connector interface of FIG. 1A;

FIG. 1E is a bottom plan view of the SN duplex connector interface of FIG. 1A;

FIG. 1F is a vertical section along an insertion axis of the SN duplex connector interface of FIG. 1A;

FIG. 2A is an end elevation of a quad SN adapter of the prior art;

FIG. 2B is a vertical section along an insertion axis of the quad SN adapter of the prior art;

FIG. 3A is a side elevation of an MDC connector of the prior art;

FIG. 3B is a perspective of the MDC connector of FIG. 3A;

FIG. 3C is another perspective of the MDC connector of FIG. 3A, showing a push-pull boot assembly thereof partially separated from a connector housing thereof;

FIG. 3D is an exploded elevation of the MDC connector of FIG. 3A showing the push-pull boot assembly separated from the connector housing;

FIG. 4A is a top plan view of a quad MDC adapter interface of the prior art;

FIG. 4B is an end elevation of the quad MDC adapter interface of FIG. 4A;

FIG. 4C is a vertical section along an insertion axis of the quad MDC adapter interface of FIG. 4A;

FIG. 5 is an elevation of a cross-compatible VSFF connector;

FIG. 6 is an exploded elevation of the VSFF connector of FIG. 5;

FIG. 7 is a perspective of the VSFF connector of FIG. 5;

FIG. 8 is an end elevation of the VSFF connector of FIG. 5;

FIG. 9 is an end elevation of an adapter compatible with the VSFF connector of FIG. 5 and the SN duplex connector;

FIG. 10 is an exploded elevation of the VSFF connector of FIG. 5;

FIG. 11 is a longitudinal section along an insertion axis of the adapter interface of the adapter of FIG. 9;

FIG. 12 is a top plan view of another embodiment of a cross-compatible VSFF connector;

FIG. 13 is a fragmentary elevation of the VSFF connector of FIG. 12 with portions of a connector housing broken away to show extenders received in grooves of the connector housing;

FIG. 14 is a top plan view of another embodiment of a cross-compatible VSFF connector;

FIG. 15 is a side elevation of the VSFF connector of FIG. 14;

FIG. 16 is a perspective of another embodiment of a cross-compatible VSFF connector;

FIG. 17 is a side elevation of the VSFF connector of FIG. 16;

FIG. 18 is a top plan view of the VSFF connector of FIG. 16;

FIG. 19 is an exploded elevation of the VSFF connector of FIG. 16;

FIG. 19A is a perspective of a latch body of the VSFF connector of FIG. 16;

FIG. 20 is a perspective of a dual latch function adapter for mating with the VSFF connector of FIG. 16;

FIG. 21 is a side elevation of the adapter of FIG. 20;

FIG. 22 is a top plan view of the adapter of FIG. 20;

FIG. 23 is a vertical section along an insertion axis of the adapter of FIG. 20;

FIG. 24 is a section similar to FIG. 23 but showing a latch arm adapter for mating with the VSFF connector of FIG. 16;

FIG. 25 is another section similar to FIG. 23 but showing a latch recess adapter for mating with the VSFF connector of FIG. 16;

FIG. 26 is a fragmentary, vertical section along an insertion axis showing the VSFF connector of FIG. 16 mated with the adapter of FIG. 20;

FIG. 27 is a section similar to FIG. 26 but showing the connection system after a first stage unlatching operation;

FIG. 28 is a section similar to FIG. 26 but showing the connection system after a second stage unlatching operation;

FIG. 29 is an enlarged, fragmentary section of the connection system in the configuration of FIG. 28, taken to show a ramp surface of the VSFF connector of FIG. 16 bending an adapter latch arm of the adapter of FIG. 20;

FIG. 30 is a fragmentary, vertical section along an insertion axis showing the VSFF connector of FIG. 16 mated with the adapter of FIG. 24;

FIG. 31 is a section similar to FIG. 31 showing an unlatching operation whereby the connector of FIG. 16 is unlatched from the adapter of FIG. 24;

FIG. 32 is an enlarged fragmentary section of the connection system as configured in FIG. 31, taken to show the ramp surface of the VSFF connector of FIG. 16 bending an adapter latch arm of the adapter of FIG. 24;

FIG. 33 is a fragmentary, vertical section along an insertion axis showing the VSFF connector of FIG. 16 mated with the adapter of FIG. 25;

FIG. 34 is a section similar to FIG. 33 showing an unlatching operation whereby the connector of FIG. 16 is unlatched from the adapter of FIG. 25;

FIG. 35 is a perspective of another embodiment of a cross-compatible VSFF connector;

FIG. 36 is an exploded perspective of the VSFF connector of FIG. 35;

FIG. 37 is a vertical section along an insertion axis of an adapter for mating with the connector of FIG. 35;

FIG. 38 is a fragmentary vertical section along an insertion axis showing the connector of FIG. 35 mated with the adapter of FIG. 37;

FIG. 39 is a section similar to FIG. 38 showing the connector of FIG. 35 partially unlatched from the adapter of FIG. 37; and FIG. 40 is a cross section similar to FIG. 38 showing the connector of FIG. 35 unlatched from the adapter of FIG. 37.

Corresponding parts are given corresponding reference numbers throughout the drawings.

DETAILED DESCRIPTION

This disclosure generally pertains to novel VSFF connectors and adapters that could facilitate cross-compatibility between different types of VSFF connectors and adapters. FIGS. 1-34 depict duplex VSFF connection system components, and FIGS. 35-40 depict MT connection system components. It is to be understood, however, that the features of any connector or adapter in accordance with the present disclosure could be adapted to the other ferrule type. In other words, any duplex-type connector or adapter disclosed herein could be adapted to use a single MT ferrule in place of the two single-fiber ferrules. Likewise, any MT-type connector or adapter disclosed herein could be adapted to use two single-fiber ferrules in place of the MT ferrule.

Conventional SN-Type Connection System

Referring to FIGS. 1A-1F, a prior art duplex SN connector is generally indicated at reference number 10. FIGS. 1A-1F depict only the interface portion of the SN connector 10—i.e., the front portion of the connector that interfaces directly with and mates inside of an adapter port. Those skilled in art will recognize that the complete SN connector 10 includes a rear section and cable boot that are not shown. As shown in FIG. 1F, the SN connector 10 comprises an inner front body 12, an outer housing 14, two optical fiber ferrules 16, and two ferrule springs 18. In the complete connector 10, a back body (not shown) is secured to the inner front body 12 to compress the ferrule springs 18 and to yieldably bias the ferrules forward. The inner front body 12 comprises top and bottom latch recesses 20, and the outer housing 14 comprises top and bottom openings 22 (FIGS. 1D-1E) that expose the latch recesses 20 and rearward facing ramp edges 24 on opposite sides of the latch opening (see FIG. 1A). The outer housing 14 further comprises top and bottom polarity keys 26, 28 (FIGS. 1C-1E). The top and bottom polarity keys 26, 28 have different shapes and/or positions so that the connector 10 can be mated with an adapter in only one correct orientation. The differently configured polarity keys 26, 28 will interfere with insertion of the connector in an inverted orientation. In the illustrated embodiment, the upper polarity key 26 is generally centered on the center line CL of the connector and has a first width W1, whereas the lower polarity key 28 is laterally offset from the center line and has a second width W2 narrower than the first width W1.

Referring to FIGS. 2A-2B a conventional quad (that is, four-connector) adapter interface for the SN connector 10 is generally indicated at reference number 30. The illustrated adapter interface 30 defines four ports. Each port has a pair of upper and lower latch arms 32, an upper keyway 36, and a lower keyway 38. The size, shape, and location of the upper keyway 36 corresponds to the size, shape, and location of the upper key 26 of the SN connector 10, and the size, shape, and location of the lower keyway 38 corresponds to the size, shape, and location of the lower key 28. Hence, the SN connector 10 can be inserted into any of the connector ports. The upper and lower keys 26, 28 will be slidably received in the upper and lower keyways 36, 38, respectively, and the opposing latch arms 32 (broadly, "a latching mechanism") will latch with the latch recesses 20 on the inner front body 12. To unlatch the connector 10 from the adapter 30, the user displaces the outer housing 14 rearward, whereby the ramp edges 24 of the outer housing lift the adapter latch arms 32 out of the latch recesses 20.

The primary difference between the duplex SN connector 10 shown in FIGS. 1A-1F and an SN-MT connector is that the two spring-loaded single-fiber ferrules 16 are replaced by a single spring-loaded MT ferrule.

Additional information about VSFF connection system components of the SN type can be found in U.S. Pat. Nos. 11,307,369, 11,280,972, 10,705,300 which are hereby incorporated by reference in their entireties.

Conventional MDC/MMC-type Connection System

Referring to FIG. 3, a duplex MDC connector is generally indicated at reference number 40. The MDC connector 40 comprises a connector housing 42, a pair of spring-loaded optical fiber ferrules 44 received in the connector housing, and a rotatable push-pull boot assembly 46 comprising a push-pull boot 48 and an extender 50 above the connector housing. The connector housing 42 comprises dovetail shaped longitudinal grooves 49 (FIG. 3C) along the upper portion and the lower portion thereof. The extender 50 comprises a dovetail-shaped tongue portion that is configured to be slidably received in either groove 49 to capture the extender and prevent vertical movement between the extender and the housing 42. The extender 50 also comprises a depressible latch 52 and a release portion 54. The depressible latch 52 protrudes upward for latching into a recess of a mating interface. The release portion 54 includes a slot through which the latch 52 protrudes. The release portion 54 is operatively connected to the boot 48 such that the release portion 54 can be displaced rearward when the user pulls on the boot. During use, when the user pulls on the boot 48, the release portion 54 moves rearward so that a front section depresses the latch 52, thereby unlatching the connector 40 from a mating interface. In the MDC connector, the extender 50 functions as a single polarity key for the connector 40. The polarity of the connector 40 can be changed by separating the boot assembly 46 from the housing 42, rotating the boot assembly 180°, and reinstalling the boot assembly onto the connector housing in an inverted orientation (whereby the extender 50 slides into the dovetail groove 49 on the opposite side of the housing).

Referring to FIGS. 4A-4C, a conventional MDC quad adapter interface is generally indicated at reference number 60. The illustrated adapter interface 60 defines four ports. Each port has an upper latch recess 62, upper alignment ribs 64, and lower alignment ribs 66 that are shorter heightwise than the upper alignment ribs. The upper and lower alignment ribs 64, 66 are sized so that the MDC connector 40 can only be inserted into an adapter port in one orientation. If an attempt is made to insert the MDC connector 40 in an inverted orientation, the ribs 64, 66 will interfere with insertion. When the MDC connector 40 is inserted, the depressible latch 52 will latch with the latch recess 62 and can be unlatched using the push-pull boot release mechanism described above.

The primary difference between the duplex MDC connector 40 shown in FIGS. 3A-3D and an SN-MT connector is that the two spring-loaded single-fiber ferrules 44 are replaced by a single spring-loaded MT ferrule.

Additional information about VSFF connection system components of the MDC/MMC type can be found in U.S. Patent Application Publication Nos. US20200285001A1, US20200284998A1, US20200150357A1, which are hereby incorporated by reference in their entireties. "MDC" and "MMC" are product designations of US Conec, LTD. of Hickory, North Carolina.

Non-Compatibility of SN and MDC

Even though the SN-type and MDC/MMC-type connectors and adapter ports are of comparable size, and even though both connection system types are meant to make a connection to the same types of ferrules supported in the same basic orientation (fiber alignment axis extends vertically), the SN-type and MDC/MMC-type connectors are not cross-compatible with the other type of adapter. For duplex VSFF connectors, an SN connector 10 cannot mate with an MDC adapter port, and conversely an MDC connector 40 cannot mate with an SN adapter port. Likewise, for MT connectors, an SN-MT connector cannot mate with an MMC adapter port, and conversely, an MMC connector cannot mate with an SN-MT adapter port. The inventors have devised modified VSFF connection system components that allow for cross-compatibility.

Cross-Compatible VSFF Connection System

Embodiment 1

Referring to FIGS. 5-11, a first embodiment of a VSFF connection system comprises an adapter 110 (FIGS. 9 and 11) that is compatible with the conventional SN connector and a modified MDC connector 140 (FIGS. 5-8 and 10). The adapter 110 has the same general features as the SN adapter 30 described above, except that, in each port, two latch recesses 112 are added inboard of the keyways 114, 116. Accordingly, along an insertion direction of a VSFF connector into the adapter 110, the opposing latch arms 132 of the adapter are inboard of the upper and lower latch recesses 112 and the upper and lower latch recesses are inboard of the first and second keyways 114, 116. The adapter 110 is configured to interface with the SN connector 10 in the same way as the adapter 30 above. However, a new MDC connector 140 is provided that is cross-compatible with the same adapter 110.

The modified MDC connector 140 includes the same general type of connector housing 142 and spring-loaded ferrules 144 as the MDC connector 40. In addition, the modified MDC connector 140 comprises a rotatable push-pull boot assembly 146 (broadly, a remote release assembly) that comprises a push-pull boot 148. But unlike the push-pull boot assembly 46 of the conventional MDC connector 40, the push-pull boot assembly 146 of the modified MDC connector 140 comprises first and second extenders 150, 151 configured to be positioned both above and below the connector housing 142. There are no side walls between the extenders 150, 151. Each extender 150, 151 comprises a depressible latch 152 and a release portion 154 that function the same way as the depressible latch 52 and release portion 54 in the conventional MDC connector. Each extender 150, 151 also comprises a respective polarity key 155, 157 (FIG. 8). The polarity key 155 corresponds in size, shape, and location to the polarity key 26 of the standard SN connector. The polarity key 157 corresponds in size, shape, and location to the polarity key 28 of the standard SN connector. As shown in FIG. 10, the modified MDC connector 140 can change from a first polarity configuration to a second polarity configuration by disconnecting the push-pull boot assembly 146 from the housing 142, rotating the push-pull boot assembly 180° about the cable (not shown), and then reinstalling the inverted push-pull boot assembly on the housing.

In use, either a plurality of conventional SN connectors 10, a plurality of modified MDC connectors 140, or a combination of both types of connectors can be inserted into the ports of a multiport modified adapter 110. The SN connector 10 is received in the adapter 110 in the same way that the SN connector 10 is received in a conventional SN adapter 30. The latch recesses 112 are not used when the SN connector is installed. When the modified MDC connector 140 is inserted into the cross-compatible adapter 110, the keys 155, 157 will be slidably received in the upper and lower keyways 114, 116, respectively. The depressible latches 152 will latch with the upper and lower latch recesses 112 and can be unlatched using the push-pull boot release mechanism in the same general way as the conventional MDC connector 40. That is, the push-pull boot 148 simultaneously actuates both extenders 154 to depress the latches 152. The adapter latch arms 132 are not used when the modified MDC connector 140 is installed. Thus, in one or more embodiments, the connector housing 142 is sized and arranged so as not to make a latched connection to the latch arms 132.

Cross-Compatible VSFF Connection System
Embodiment 2

Referring to FIGS. 12-13, a second embodiment of a VSFF connection system comprises the conventional SN adapter 30, the conventional SN connector 10, and a second embodiment of modified MDC connector 240 that is compatible with the conventional SN adapter. The modified MDC connector 240 includes a connector housing 242 supporting a pair of spring-loaded ferrules 244. The connector housing 242 is modified relative to the connector housing 42 to comprise opposing upper and lower latch recesses 243 in the same location as the latch recesses of the inner front body 12 of the conventional SN connector 10. Each latch recess 243 defines a rearward facing latch surface on the left side and the right side of an extender guide groove 245. Preferably, the extender guide groove 245 has a dovetail shape configuration to facilitate a sliding dovetail connection. When the connector 240 is mated with a port of the SN adapter 30, the latch recesses 243 latch with the latch arms 32 of the respective port.

The modified MDC connector 240 further comprises a rotatable push-pull boot assembly 246 that comprises a rotatable, polarity-changeable push-pull boot 248. But unlike the push-pull boot assembly 46 of the conventional MDC connector, the push-pull boot assembly 246 of the modified MDC connector 240 comprises first and second extenders 250, 251 configured to be positioned both above and below the connector housing 242. Further, unlike the conventional extender 50, neither of the extenders 250, 251 comprises a depressible latch. Each extender 250, 251 instead comprises a dovetail shaped arm configured to be slidably received in one of the extender grooves 245. The front end portion of each extender arm 250, 251 defines a rearward facing ramp 259 configured for unlatching the connector 240 from the adapter 10. When the connector 240 is inserted into a port of the adapter 10, each ramp 259 is located in front of the rearward facing latch surface of the corresponding latch recess 243. Thus, the adapter latch arms 32 can latch with the latch recesses 243 of the connector housing 242. To unlatch the connector 240 from the adapter 10, the user pulls on the boot 248, which displaces the extenders 250, 251 rearward. The rearward facing ramps 259 move backward under the latch arms and lift the latch arms out of the latch recesses 243 to unlatch the connector 240 from the adapter.

Each extender 250, 251 further comprises a respective polarity key 255, 257. The polarity key 255 corresponds in size, shape, and location to the polarity key 26 of the standard SN connector. The polarity key 257 corresponds in size, shape, and location to the polarity key 28 of the standard SN connector. The modified MDC connector 240 can change from a first polarity configuration to a second polarity configuration by disconnecting the push-pull boot assembly 246 from the housing 242, rotating the push-pull boot assembly 180° about the cable, and then reinstalling the inverted push-pull boot assembly on the housing whereby the extenders 250, 251 slide into the extender grooves 245 on the opposite side of the housing 242.

Cross-Compatible VSFF Connection System
Embodiment 3

Referring to FIGS. 14-15, a third embodiment of a VSFF connection system comprises the conventional SN adapter 30, the conventional SN connector 10, and a second embodiment of modified MDC connector 340 that is compatible with the conventional SN adapter. The modified MDC connector 340 includes a connector housing 342 supporting a pair of spring-loaded ferrules 344. The connector housing 342 is modified relative to the connector housing 42 to comprise opposing upper and lower latch recesses 343 in the same location as the latch recesses 24 of the inner front body 12 of the conventional SN connector 10. Each latch recess 343 is located centrally along the width of the housing 342 along a respective central slide rail (concealed by other components in the drawings). Preferably, the central slide rail has a dovetail shape configuration to facilitate a sliding dovetail connection. When the connector 340 is mated with a port of the SN adapter 30, the latch recesses 343 latch with the latch arms 32 of the respective port.

The modified MDC connector 340 further comprises a rotatable push-pull boot assembly 346 that comprises a rotatable, polarity-changeable push-pull boot 348. But unlike the push-pull boot assembly 46 of the conventional MDC connector, the push-pull boot assembly 346 of the modified MDC connector 340 comprises first and second extenders 350, 351 configured to be positioned both above and below the connector housing 342. Further, unlike the conventional extender 50, neither of the extenders 350, 351 comprises a depressible latch. Each extender 350, 351 instead comprises an extender with a longitudinal dovetail shaped groove along the bottom configured to slidably engage one of the (concealed) dovetail shaped rails of the connector housing 342. The front end portion of each extender 350, 351 defines an opening 371 through which the respective latch recess 343 is exposed. Similar to a conventional SN connector, on each lateral side of the latch recess 343, the respective arm 350, 351 defines left and right rearward facing ramp edges 373 configured for unlatching the connector 340 from the adapter 10.

When the connector 340 is inserted into a port of the adapter 10, each ramp edge 373 is located in front of the corresponding latch recess 343 and each opening 371 is aligned with the corresponding latch recess so that the adapter latch arms 32 can latch with the latch recesses 343 through the openings 371. To unlatch the connector 340 from the adapter 10, the user pulls on the boot 348, which displaces the extenders 350, 351 rearward. The rearward facing ramp edges 373 move backward under the latch arms 32 and lift the latch arms out of the latch recesses 343 to unlatch the connector 340 from the adapter.

Each extender arm 350, 351 further comprises a respective polarity key 355, 357. The polarity key 355 corresponds in size, shape, and location to the polarity key 26 of the standard SN connector. The polarity key 357 corresponds in size, shape, and location to the polarity key 28 of the standard SN connector. The modified MDC connector 340 can change from a first polarity configuration to a second polarity configuration by disconnecting the push-pull boot assembly 346 from the housing 342, rotating the push-pull boot assembly 180° about the cable, and then reinstalling the inverted push-pull boot assembly on the housing whereby the extenders 350, 351 slidably connect to the rails 345 on the opposite side of the housing 342.

Cross-Compatible VSFF Connection System
Embodiment 4

Referring to FIGS. 16-25, a fourth embodiment of a VSFF connection system comprises dual latch function adapter 430 (FIGS. 20-23), a latch arm adapter 530 (FIG. 24), a latch recess adapter 630 (FIG. 25), and a dual latch function VSFF connector 710 (FIGS. 16-19A) that is compatible with each of the dual latch function adapter, the latch arm adapter, and the latch recess adapter. The dual latch function adapter 430 and the latch arm adapter 530 are also configured for mating with a standard SN connector 10.

Referring to FIGS. 16-19A, the dual latch function VSFF connector 710 includes a connector housing assembly 711 supporting a pair of spring-loaded ferrules 744. In the illustrated embodiment, the connector housing assembly 711 is a three-part assembly (FIG. 19), including an inner housing sub-assembly 712, a latch housing 713, and a latch release 714. The latch release 714 is fastened to a push-pull boot 748 to move backward with the push-pull boot when the push-pull boot is pulled to extract the connector 710 from an adapter. The inner housing sub-assembly 712 comprises a front body 715 and a back body 716 fastened to the front body to load ferrule springs for urging the ferrules 744 forward in the connector housing assembly 711. The inner front body 715 of the inner housing assembly 712 has similar features to the inner front housing 12 of the SN connector. In particular, the inner front body 714 comprises top and bottom latch recesses 720 configured to facilitate latching with the latch arm adapter 530 and the dual latch function adapter 430 described in further detail below.

The latch housing 713 has a rear end portion including left and right sidewalls 721. An upper extension 722 and a lower extension 723 extend forward from the rear end portion of the latch housing 713 with no sidewalls therebetween. The upper and lower extensions 722, 723 are configured to slidably engage the upper and lower portions of the inner housing sub-assembly 712 (e.g., at sliding tongue-and-groove joints). As can be seen in FIGS. 16 and 17, the sidewalls of the inner front body 715 are exposed between the upper and lower extension 722, 723 of the latch housing 713. The front end portion of each extension 722, 723 defines an opening 771 through which the respective latch recess 720 is exposed. Similar to a conventional SN connector, on each lateral side of the latch recess 720, the respective extension 722, 723 defines left and right rearward facing ramp edges 724 configured for unlatching the connector 710 from the latch arm adapter 530, and also for performing a second-stage unlatching operation to unlatch the connector from the dual latch function adapter 430 as will be described in further detail below.

Behind the upper and lower extensions 722, 723, the upper and lower portions of the latch housing 713 comprise upper and lower latches 752, respectively. Referring to FIG. 19A, each latch 752 is cantilevered rearward from the respective extension 722, 723. In addition, each latch 752 is centrally located in a cutout 753 between the left and right sidewalls 721. As shown in FIG. 19A, each latch 752 comprises an arm portion 755 and a hook portion 757. A front section of the arm portion 755 extends horizontally rearward and a rear section of the arm portion is angled with respect to the front second to extend outward away from the center line of the connector 710 as it extends rearward to a rear end of the latch 752. The front and rear sections of the arm portion 755 meet at an angle, which forms a resilient living hinge 759 at which the latch 722 is configured to resiliently bend when it is depressed for unlatching. The hook portion 757 protrudes outward from the arm portion 755 to define a forward-facing hook surface.

Referring to FIGS. 16-19, the latch release 714 comprises a rear end portion configured to fasten to the push-pull boot 748. Upper and lower extensions 782, 784 protrude forward from the rear end portion of the latch release 714. As shown in FIGS. 16 and 18, the upper and lower extensions 782, 784 of the latch release 714 are configured to be slidably received in the respective cutout 753 of the latch housing 713. Each extension 782, 784 also defines a slot 785 configured for receiving the respective latch 752 such that latch protrudes outward. A front portion of each extension 782, 784 in front of the slot 785 is positioned above the horizontal front section of the arm portion 755 of the respective latch 752. As will be explained in further detail below, to extract the connector 710 from an adapter 430, 530, 630, a user pulls the boot 748 rearward. This moves the latch release 714 rearward so that the front portions of the extensions 782, 784 slide rearward along the angled sections of the arm portions 755 of the latches 752, which causes the arm portions 755 to bend at the hinges 759 and depresses the latches inward. The front portions of the extensions 782, 784 then engage the forward-facing surfaces of the hook portions 757. This links the latch housing 713 to the latch release 714 so that further pulling displaces both the latch housing and the latch release rearward in relation to the inner housing assembly 712.

Accordingly, in the illustrated embodiment, the latch housing 713, latch release 714, and push-pull boot 748 collectively form a push pull boot assembly 746 (FIG. 19) of the connector 710. Unlike the push-pull boot assembly 46 of the conventional MDC connector 40, the push-pull boot assembly 746 of the connector 740 comprises upper and lower extenders. The upper extender of push-pull boot assembly 746 includes the upper extensions 722, 782 of the latch housing 713 and latch release 714, respectively, and the lower extender of push-pull boot assembly 746 includes the lower extensions 723, 784 of the latch housing and latch release, respectively. Each extender comprises an SN-type cutout 771 and ramp surfaces 724 for unlatching the connector 710 from SN adapter-type latch arms. In addition, each extender comprises a depressible latch 752 and latch actuator similar to the release portion 54 of a conventional MDC connector 40. More particularly, the front portions of the latch release extensions 782, 784 function similarly to the way the release portion 54 in the conventional MDC connector functions (e.g., depressing the latches 752 by camming action when the push-pull boot assembly 746 is pulled back). In one or more embodiments, the protruding hook portions 757 of the upper and lower latches 752 have different widths so that the latches function as polarity keys. It will be appreciated, however, that other polarity key structures (e.g., keys formed on the latch release 714) could also be used without departing from the scope of the disclosure. Suitably, the polarity key structures correspond in size, shape, and location to the polarity keys 26, 28 of the standard SN connector. In certain embodiments, the connector 710 can change from a first polarity configuration to a second polarity configuration by disconnecting the push-pull boot assembly 746 from the inner housing assembly 712, rotating the push-pull boot assembly 180° about the cable (not shown), and then reinstalling the inverted push-pull boot assembly on the inner housing assembly.

Referring to FIGS. 20-23, the dual latch function adapter 430 comprises at least one dual-function port 431. In the illustrated embodiment, the adapter 430 comprises one dual-function port 431 and an opposing standard SN adapter port 433 configured for mating with a standard SN connector 10. This shows that the dual latch function adapter 430 is capable of mating a standard SN connector to the modified VSFF connector 710. It will, of course, be understood that adapter could be configured with opposing dual-function ports. Additionally, though a single-port adapter 430 is shown in FIGS. 20-23, it is to be appreciated that the adapter could be a multiport adapter without departing from the scope of the disclosure.

Each port 431, 433 comprises upper and lower adapter latch arms 432 of the type used for latching with an SN connector 10. The latch arms 432 in the dual-function port 431 are configured for latching with the latch recess 720 of the connector 710 in the same manner that conventional SN adapter latch arms latch with conventional SN adapters. The dual-function port 431 further comprises upper and lower latch recesses 462 configured for latching with the latches 752 of the connector 710.

Referring to FIG. 24, the latch arm adapter 530 has substantially the same port construction as a standard SN adapter. That is, the adapter 530 comprises two standard SN-style ports 533, each containing a pair of opposing latch arms 532 of the type configured for latching with an SN connector 710. Both ports 533 are configured to accept either a standard SN connector 10 or the VSFF connector 710. The latch arm adapter 530 is devoid of latch recesses.

Referring to FIG. 25, the latch recess adapter 630 comprises at least one port 631 that is devoid of latch arms and relies exclusively on upper and lower latch recesses 662 for latching with the VSFF connector 710. In the illustrated embodiment, the adapter 630 comprises one latch recess-only port 631 and one standard SN port 633 containing a pair of opposing latch arms 632. This again shows that the latch recess adapter 630 is capable of making an optical connection between a standard SN connector and the VSFF connector 710. It will, of course, be understood that adapter could be configured with opposing latch recess-only ports.

Referring to FIGS. 26-29, a method of using the VSFF connector 710 with a dual latch function adapter 430 will now be briefly described. FIG. 26 shows the VSFF connector 710 mated with the dual-function port 431 of the adapter 430. As can be seen, the adapter latch arms 432 are latched with the latch recesses 720, and the connector latches 752 are latched with the recesses 462. Thus, when mated to a dual-function port 431, the VSFF connector 710 is configured to establish two points of latched connection along both the top and bottom of the connector, the first being where an adapter latch arm 432 latches with a connector latch recess 720 and the second being where the connector latch 752 latches with the adapter latch recess 462.

To extract the connector 710 from the adapter 430, the user pulls backward on the push-pull boot 748, which causes a two-stage unlatching operation. FIG. 27 depicts the first stage of the unlatching operation. As the boot 748 is pulled back, it displaces the latch release 714. The front portion of each extension 782, 784 of the latch release 714 slides rearward along the angled section of the arm portion 755 of the adjacent latch 752. Camming action causes each arm portion 755 to bend at the hinge 759 and draws the hook portion 757 inward. The latches 752 are thereby depressed and unlatched from the latch recesses 462. At about the same time, the front portions of the extensions 782, 784 are pulled backward into engagement with the forward facing hook surfaces of the hooks 757. This facilitates the second stage of the unlatching operation.

Referring to FIGS. 28 and 29, as the push-pull boot 748 is pulled further, the engagement of extensions 782, 784 with the forward-facing surfaces of the hook portions 757 links the latch housing 713 to the latch release 714 so that the boot displaces both the latch housing and the latch release rearward in relation to the inner housing assembly 712. Rearward displacement of the latch housing 713 draws the ramp edges 724 along the adapter latch arms 432 and spreads the adapter latch arms so that they unlatch from the connector latch recesses 720. (The unlatching action here is the same as conventional SN connectors and adapters). Lifting the adapter latch arms 432 out of the connector latch recesses 720 completes the second stage unlatching operation. As the boot 748 is pulled further, the connector 710 is unplugged and extracted from the dual-function port 431.

Referring to FIGS. 30-32, a method of using the VSFF connector 710 with a latch arm adapter 530 will now be briefly described. FIG. 30 shows the VSFF connector 710 mated with the latch arm port 533 of the adapter 530. As can be seen, the adapter latch arms 532 are latched with the latch recesses 720 but the connector latches 752 are not latched to the adapter 530. Thus, when mated to a latch arm port 533, the VSFF connector 710 is configured to establish only one point of latched connection along each of the top and bottom of the connector, i.e., where an adapter latch arm 432 latches with a connector latch recess 720. To extract the connector 710 from the adapter 530, the user pulls backward on the push-pull boot 748. As the boot 748 is pulled back, it displaces the latch release 714. The front portion of each extension 782, 784 slides rearward along the angled section of the arm portion 755 of the adjacent latch 752. Camming action causes each arm portion 755 to bend at the hinge 759 and draws the hook portion 757 inward. But because the latches 752 are not latched to the adapter 530, no unlatching occurs when the latches are depressed. However, depressing the latches 752 allows the front portions of the extensions 782, 784 to engage the forward facing hook surfaces of the hooks 757. As the push-pull boot 748 is pulled further, the boot displaces both the latch housing and the latch release. Rearward displacement of the latch housing 713 draws the ramp edges 724 along the adapter latch arms 532 and spreads the adapter latch arms outward so that they unlatch from the connector latch recesses 720. Lifting the adapter latch arms 532 out of the connector latch recesses 720 unlatches the connector 710 from the adapter 530 so that the connector is unplugged and extracted.

Referring to FIGS. 33-34, a method of using the VSFF connector with a latch recess adapter 630 will now be briefly described. FIG. 33 shows the VSFF connector 710 mated with the latch recess-only port 631. The connector latches 752 are latched with the recesses 662. Thus, when mated to a latch recess-only port 631, the VSFF connector 710 is latched at one location along each of the top and bottom of the connector, i.e., where the connector latch 752 latches with the adapter latch recess 662. To extract the connector 710 from the adapter 630, the user pulls backward on the push-pull boot 748. As the boot 748 is pulled back, it displaces the latch release 714. The front portion of each extension 782, 784 of the latch release slides rearward along the angled section of the arm portion 755 of the adjacent latch 752. Camming action causes each arm portion 755 to bend at the hinge 759 and draws the hook portion 757 inward. The latches 752 are thereby depressed and unlatched from the latch recesses 662. Further pulling on the boot 748 extracts the connector from the port 631.

Cross-Compatible VSFF Connection System
Embodiment 5

Referring to FIGS. 35-37, a fifth embodiment of a VSFF connection system comprises a VSFF MT connector 810 (FIGS. 35-36) and a dual latch function adapter 930 (FIG. 37) that is cross-compatible with the connector 810 and standard SN-MT connectors. As shown in FIGS. 35-36, the dual latch function VSFF connector 810 includes a connector housing assembly 811 supporting a single spring-loaded MT ferrule 844. The connector housing assembly 811 is a two-part assembly, including an inner housing sub-assembly 812 and an outer latch release housing 814, which is fastened to a push-pull boot 848. As shown in FIG. 36, the inner housing sub-assembly 812 comprises a front body 815 and a back body 816 fastened to the front body to load a ferrule spring for urging the MT ferrule 844 forward in the connector housing assembly 811. The inner front body 815 of the inner housing assembly 812 has similar features to the inner front housing of an SN or SN-MT connector. In particular, the inner front body 815 comprises top and bottom latch recesses 820 that are configured to facilitate latching with a standard SN-MT adapter or the dual latch function adapter 930, as will be described in further detail below. The inner front body 815 further comprises upper and lower latches 852. Each latch 852 is angled to extend outward away from the center line of the connector 710 as it extends rearward to a rear end. Each latch 852 is configured to latch with the dual latch function adapter 930 and bend about a resilient living hinge 859 when it is depressed for unlatching from the adapter.

The outer housing 814 comprises a front end portion and upper and lower extenders 821, 822 extending rearward from the front end portion. There are no sidewalls between the extenders 821, 822. The upper and lower extensions 821, 822 are configured to slidably engage the upper and lower portions of the inner housing sub-assembly 812. The front end portion of each extension 821, 822 defines an opening 871 through which the respective latch recess 820 is exposed. Similar to a conventional SN-MT connector, on each lateral side of the latch recess 820, the respective extension 821, 822 defines left and right rearward facing ramp edges 824 configured for lifting adapter latch arms out of the latch recesses 820.

Behind the openings 871, each extender 821, 822 defines a slot 885 configured for receiving a respective latch 852 such that the latch protrudes outward from the respective extender. An actuating portion 886 of each extender 821,

822 in front of the slot 885 is positioned for sliding rearward along the respective latch 752 and depressing the latch by camming action.

Behind the slots 885, each extension comprises a recess 888 configured for receiving a wing of the push-pull boot 848. The recess 888 latches to the push-pull boot 848 so that the outer latch release housing 815 moves with the push-pull boot when the boot is pulled backward.

Referring to FIG. 37, the dual latch function adapter 930 comprises at least one dual-function port 931. In the illustrated embodiment, the adapter 930 comprises one dual-function port 931 and an opposing standard SN-MT adapter port 933 configured for mating with a standard SN-MT connector (not shown). This shows that the dual latch function adapter 930 is capable of making an optical connection between a standard SN-MT connector and the VSFF connector 810. It will, of course, be understood that the adapter could be configured with opposing dual-function ports 931. Additionally, it is to be appreciated that the adapter could be a multiport adapter without departing from the scope of the disclosure. Each port 931, 933 comprises upper and lower latch arms 932 of the type used for latching an SN-MT connector within a mating adapter. The dual-function port 931 further comprises upper and lower latch recesses 962 configured for latching with the latches 952 of the connector 910.

Referring to FIGS. 38-40, a method of using the VSFF connector 810 with a dual latch function adapter 930 will now be briefly described. FIG. 38 shows the VSFF connector 810 mated with the dual-function port 931 of the adapter 930. As can be seen, the adapter latch arms 932 are latched with the connector latch recesses 820, and the connector latches 852 are latched with the adapter latch recess 962. To extract the connector 810 from the adapter 930, the user pulls backward on the push-pull boot 848. As the boot 848 is pulled back, it displaces the outer latch release housing 814 in relation to the inner housing assembly 812. As shown in FIGS. 39-40, the actuating portions 886 of the extenders 821, 822 slide rearward along the connector latches 852 and depress the connector latches by camming action. Depressing the connector latches 852 unlatches them from the adapter recesses 962 as shown in FIG. 40. More or less simultaneously with the latches 852 being depressed, the ramp edges 824 slide along the adapter latch arms 932 and spread the adapter latch arms outward so that they unlatch from the connector latch recesses 820. With all points of latching now released, as the boot 848 is pulled further, the connector 810 is unplugged and extracted from the dual-function port 931.

It will be appreciated that the VSFF connector 810, with its dual latch function capability, is also compatible with a standard SN-MT adapter (not shown) having only the adapter latch arms 932 but not the latch recesses 962. Likewise, the VSFF connector 810, with its dual latch function capability, is compatible with an adapter (not shown) having only the adapter latch recesses 962 but not adapter latch arms 932. Additionally, it can be seen that the dual-function port 931 of adapter 930 can be mated with a standard SN-MT connector (not shown).

Accordingly, it can be seen that this disclosure provides several cross-compatibility solutions for VSFF connection systems. By making the VSFF connection systems cross-compatible, the inventors believe that industry might adopt VSFF technology more quickly, which has the potential to yield substantial benefits toward improved network bandwidth, reliability, design, and implementation.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A VSFF optical fiber connector comprising:
a connector housing having a top portion and a bottom portion;
a ferrule arrangement for terminating a plurality of optical fibers, the ferrule arrangement comprising one of (i) a pair of spring-loaded single-fiber ferrules and (ii) a single spring-loaded MT ferrule, the ferrule arrangement being received in the connector housing such that the optical fibers are spaced apart vertically between the top portion and the bottom portion of the connector housing;
a connector latch recess configured for latching with an adapter latch arm of a mating adapter of a first type; and
a connector latch configured for latching with an adapter latch recess of a mating adapter of a second type.

2. The VSFF optical fiber connector of claim 1, further comprising a remote release assembly configured for both (a) unlatching the connector latch recess from the adapter latch arm of the mating adapter of the first type and (b) unlatching the connector latch from the adapter latch recess of the mating adapter of the second type.

3. The VSFF optical fiber connector of claim 2, wherein the remote release comprises first and second extenders, the first extender being slidably engaged with the top portion of the connector housing and the second extender being slidably engaged with the bottom portion of the connector housing, wherein the remote release assembly is configured to be displaced rearward in relation to the connector housing.

4. The VSFF optical fiber connector of claim 3, wherein the connector latch recess comprises an upper connector latch recess on the top portion of the connector housing and a lower connector latch recess on the bottom portion of the connector housing; wherein the connector latch comprises an upper connector latch on the top portion of the connector housing and a lower connector latch on the bottom portion of the connector housing.

5. The VSFF optical fiber connector of claim 4, wherein the first extender is configured for both (a) unlatching the upper connector latch recess from the mating adapter of the first type and (b) unlatching the upper connector latch from the mating adapter of the second type and wherein the second extender is configured for both (a) unlatching the lower connector latch recess from the mating adapter of the first type and (b) unlatching the lower connector latch from the mating adapter of the second type.

6. The VSFF optical fiber connector as set forth in claim 3, wherein the remote release assembly comprises a push-pull boot connected to the first and second extenders.

7. The VSFF optical fiber connector as set forth in claim 2, wherein the remote release assembly is configured to be disconnected from the connector housing, rotated 180° about a cable and reconnected to the connector housing so that the first extender is slidably engaged with the bottom portion of the connector housing, the second extender is slidably engaged with the top portion of the connector housing and the VSFF optical fiber connector switches from a first polarity configuration to a second polarity configuration.

8. An optical fiber adapter for one or more VSFF connectors, the optical fiber adapter comprising:
a top wall defining an upper latch recess configured to latch with a first depressible latch of a first type of VSFF connector;
a bottom wall defining a lower latch recess configured to latch with a second depressible latch arm of the first type of VSFF connector; and
a pair of opposing latch arms configured to latch with upper and lower latch recesses of a second type of VSFF connector.

9. The optical fiber adapter as set forth in claim 8, wherein the top wall of the adapter further defines a first keyway and the bottom wall of the adapter further defines a second keyway of different size and/or position than the first keyway.

10. The optical fiber adapter as set forth in claim 9, wherein along an insertion direction of a VSFF connector into the adapter, the opposing latch arms are inboard of the upper and lower latch recesses and the upper and lower latch recesses are inboard of the first and second keyways.

11. The optical fiber adapter as set forth in claim 8, wherein along an insertion direction of a VSFF connector into the adapter, the opposing latch arms are inboard of the upper and lower latch recesses.

12. A VSFF optical fiber connector comprising:
a connector housing having a top portion and a bottom portion;
a ferrule arrangement for terminating a plurality of optical fibers arranged in at least one line, the ferrule arrangement comprising one of (i) a pair of spring-loaded single-fiber ferrules and (ii) a single spring-loaded MT ferrule, the ferrule arrangement being received in the connector housing such that the optical fibers of said at least one line are spaced apart in a vertical line between the top portion and the bottom portion of the connector housing;
a remote release assembly comprising first and second extenders, the first extender being slidably engaged with the top portion of the connector housing and the second extender being slidably engaged with the bottom portion of the connector housing, wherein the remote release assembly is configured to be displaced rearward in relation to the connector housing and wherein each extender is configured to unlatch a respective latching connection between the connector housing and a mating adapter as the remote release assembly is displaced rearward in relation to the connector housing;
wherein each of the first and second extenders comprises a respective polarity key.

13. The VSFF optical fiber connector as set forth in claim 12, wherein the remote release assembly comprises a push/pull boot connected to the first and second extenders.

14. The VSFF optical fiber connector as set forth in claim 12, wherein each of the first and second extenders comprises a depressible latch.

15. A VSFF optical fiber connector comprising:

a connector housing having a top portion and a bottom portion;

a ferrule arrangement for terminating a plurality of optical fibers arranged in at least one line, the ferrule arrangement comprising one of (i) a pair of spring-loaded single-fiber ferrules and (ii) a single spring-loaded MT ferrule, the ferrule arrangement being received in the connector housing such that the optical fibers of said at least one line are spaced apart in a vertical line between the top portion and the bottom portion of the connector housing;

a remote release assembly comprising first and second extenders, the first extender being slidably engaged with the top portion of the connector housing and the second extender being slidably engaged with the bottom portion of the connector housing, wherein the remote release assembly is configured to be displaced rearward in relation to the connector housing and wherein each extender is configured to unlatch a respective latching connection between the connector housing and a mating adapter as the remote release assembly is displaced rearward in relation to the connector housing;

wherein each of the first and second extenders comprises a reward facing ramp.

16. A VSFF optical fiber connector comprising:

a connector housing having a top portion and a bottom portion;

a ferrule arrangement for terminating a plurality of optical fibers arranged in at least one line, the ferrule arrangement comprising one of (i) a pair of spring-loaded single-fiber ferrules and (ii) a single spring-loaded MT ferrule, the ferrule arrangement being received in the connector housing such that the optical fibers of said at least one line are spaced apart in a vertical line between the top portion and the bottom portion of the connector housing;

a remote release assembly comprising first and second extenders, the first extender being slidably engaged with the top portion of the connector housing and the second extender being slidably engaged with the bottom portion of the connector housing, wherein the remote release assembly is configured to be displaced rearward in relation to the connector housing and wherein each extender is configured to unlatch a respective latching connection between the connector housing and a mating adapter as the remote release assembly is displaced rearward in relation to the connector housing;

wherein each of the first and second extenders slidably engages the respective one of the top portion and the bottom portion of the connector housing at a sliding dovetail connection.

17. The VSFF optical fiber connector as set forth in claim 12, wherein the remote release assembly is configured to be disconnected from the connector housing, rotated 180° about a cable and reconnected to the connector housing so that the first extender is slidably engaged with the bottom portion of the connector housing, the second extender is slidably engaged with the top portion of the connector housing and the VSFF optical fiber connector switches from a first polarity configuration to a second polarity configuration.

18. A VSFF optical fiber connector comprising:

a connector housing having a top portion and a bottom portion;

a ferrule arrangement for terminating a plurality of optical fibers arranged in at least one line, the ferrule arrangement comprising one of (i) a pair of spring-loaded single-fiber ferrules and (ii) a single spring-loaded MT ferrule, the ferrule arrangement being received in the connector housing such that the optical fibers of said at least one line are spaced apart in a vertical line between the top portion and the bottom portion of the connector housing;

a remote release assembly comprising first and second extenders, the first extender being slidably engaged with the top portion of the connector housing and the second extender being slidably engaged with the bottom portion of the connector housing, wherein the remote release assembly is configured to be displaced rearward in relation to the connector housing and wherein each extender is configured to unlatch a respective latching connection between the connector housing and a mating adapter as the remote release assembly is displaced rearward in relation to the connector housing;

wherein each of the first and second extenders comprises a slot and the VSFF optical fiber connector comprises a first connector latch received in the slot of the first extender and a second connector latch received in the slot of the second extender.

19. An optical fiber adapter for one or more VSFF connectors, the optical fiber adapter comprising:

a receptacle defining an opening for receiving one or more of the VSFF connectors, the receptacle being configured to receive a first depressible latch of a first type of VSFF connector, for releasably connecting with the first type of VSFF connector; and a latching mechanism in the receptacle configured to be releasably received in a latch recess of a second type of VSFF connector whereby either the VSFF connector of the first type or the VSFF connector of the second type can be received in the opening and releasably connected to the receptacle.

*     *     *     *     *